US012389096B2

(12) United States Patent
Huang et al.

(10) Patent No.: US 12,389,096 B2
(45) Date of Patent: Aug. 12, 2025

(54) CAMERA MODULE WITH ELECTROSTATIC DISCHARGE PROTECTION

(71) Applicant: Google LLC, Mountain View, CA (US)

(72) Inventors: Jingyu Huang, Santa Clara, CA (US); Liang Ching Tseng, Taipei (TW); Tsung-Dar Cheng, Taipei (TW); Alexander P. Wroblewski, San Francisco, CA (US); Weifeng Pan, Palo Alto, CA (US); Warwick Ka Kui Wong, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/565,472

(22) PCT Filed: Aug. 1, 2022

(86) PCT No.: PCT/US2022/074386
§ 371 (c)(1),
(2) Date: Nov. 29, 2023

(87) PCT Pub. No.: WO2024/030150
PCT Pub. Date: Feb. 8, 2024

(65) Prior Publication Data
US 2025/0097553 A1   Mar. 20, 2025

(51) Int. Cl.
*H04N 23/52*  (2023.01)
*H04N 23/55*  (2023.01)
*H04N 23/57*  (2023.01)

(52) U.S. Cl.
CPC ............. *H04N 23/52* (2023.01); *H04N 23/55* (2023.01); *H04N 23/57* (2023.01)

(58) Field of Classification Search
CPC ........ H04N 23/55; H04N 23/57; H04N 23/51; H04N 23/52; G03B 17/02
(Continued)

(56) References Cited

U.S. PATENT DOCUMENTS 6,859,351 B2 * 2/2005 Byrne .................... H05K 1/026
361/220
7,554,620 B2 * 6/2009 Kim ..................... H05K 9/0067
349/40
(Continued)

FOREIGN PATENT DOCUMENTS

KR   20210022887   3/2021
KR   20220039535   3/2022

OTHER PUBLICATIONS

"Foreign Office Action", AU Application No. 2022440629, Mar. 21, 2024, 3 pages.
(Continued)

*Primary Examiner* — Pritham D Prabhakher
(74) *Attorney, Agent, or Firm* — Colby Nipper PLLC

(57) ABSTRACT

The present document describes a camera module with electrostatic discharge (ESD) protection. In particular, the camera module includes a lightning rod structure, which guides an ESD current to a safe location (e.g., system ground) when a lens retainer of the camera module is hit by an ESD spark. Due to the impact on camera focus tuning and the risk of audio rub and buzz, the lightning rod structure does not physically touch the lens retainer. As such, a gap separates the lightning rod structure from the lens retainer. When the lens retainer is stressed by an ESD spark, the gap is broken down and a conductive path is established to guide the ESD current to the safe location through the lightning rod structure. In this way, the ESD current flows along a controlled path instead of jumping to arbitrary locations, which protects nearby susceptible circuitry.

20 Claims, 14 Drawing Sheets

(58) Field of Classification Search
USPC .......................................................... 348/373
See application file for complete search history.

(56) References Cited

U.S. PATENT DOCUMENTS

| | | | | |
|---|---|---|---|---|
| 7,609,465 | B2 * | 10/2009 | Wu | G02B 7/023 |
| | | | | 359/823 |
| 8,643,772 | B2 | 2/2014 | Anderson | |
| 10,432,828 | B2 * | 10/2019 | Park | H04N 25/617 |
| 10,958,815 | B1 * | 3/2021 | Chen | H05K 1/189 |
| 11,892,749 | B2 * | 2/2024 | Wei | H04N 23/54 |
| 2004/0027779 | A1 | 2/2004 | Byrne et al. | |
| 2009/0225452 | A1 * | 9/2009 | Wu | G02B 7/023 |
| | | | | 359/824 |
| 2011/0216237 | A1 * | 9/2011 | Shinohara | H04N 23/663 |
| | | | | 348/E5.026 |
| 2012/0113317 | A1 * | 5/2012 | Anderson | H04N 23/51 |
| | | | | 348/E5.026 |
| 2015/0366110 | A1 * | 12/2015 | Park | H05K 9/0067 |
| | | | | 348/373 |
| 2016/0353616 | A1 * | 12/2016 | Dinh | H05K 1/0215 |
| 2018/0227466 | A1 | 8/2018 | Park | |
| 2021/0271152 | A1 | 9/2021 | Wei et al. | |
| 2022/0167490 | A1 * | 5/2022 | Berg | G01R 19/16533 |
| 2023/0393422 | A1 * | 12/2023 | Moubedi | G02C 11/10 |

OTHER PUBLICATIONS

"International Search Report and Written Opinion", Application No. PCT/US2022/074386, Apr. 3, 2023, 10 pages.
"International Preliminary Report on Patentability", Application No. PCT/US2022/074386, Feb. 4, 2025, 6 pages.

* cited by examiner

CAMERA MODULE WITH ELECTROSTATIC DISCHARGE PROTECTION

RELATED APPLICATION(S)

This application is a national stage entry of International Application No. PCT/US2022/074386, filed Aug. 1, 2022, the disclosure of which is incorporated herein by reference in its entirety.

BACKGROUND

Cameras with adjustable lenses are widely used in consumer electronics, including video-recording doorbells, surveillance devices, and so forth. Many devices include the camera lens sealed inside a lens retainer, which is typically made of metal. A metal lens retainer, however, is vulnerable to attracting electrostatic discharge (ESD) sparks, which can affect the operation of the camera. For example, a device with a camera undergoing ESD failure may experience an irregular display, interrupted video streaming, abnormal execution of an application ("app"), permanent loss of function, and so forth.

One conventional solution providing ESD protection for the camera includes sealing the lens retainer with a plastic cover, but this approach may include high cost, larger product size, and may impact optical performance due to an additional object being in front of the camera. Another conventional solution includes using a grounding structure to tie the metal retainer to the ground of the camera board, but because the lens retainer is an adjustable (e.g., movable) part during focus tuning, challenges arise in attempting to ground a moving part. Accordingly, camera tuning and focusing performance may be impacted due to the extra force from the grounding structure. Another conventional solution includes adding ESD protection components (e.g., transient-voltage-suppression (TVS) diodes) to protect the susceptible signals and components in the camera board, but this approach may require high component cost, more printed circuit board (PCB) space, and extensive trial-and-error to adjust the protection during failure analysis, which can significantly lengthen the development cycle and time-to-market.

SUMMARY

The present document describes a camera module with ESD protection. In particular, the camera module includes a lightning rod structure, which guides an ESD current to a safe location (e.g., system ground) when a lens retainer of the camera module is hit by an ESD spark. In order to eliminate the impact on camera focus tuning and the risk of audio rub and buzz, the lightning rod structure does not physically touch the lens retainer. Thus, a gap (e.g., insulation) separates the lightning rod structure from the lens retainer. When the lens retainer is stressed by an ESD spark, the gap experiences electrical breakdown and becomes a conductor, establishing a conductive path to guide the ESD current to the safe location through the lightning rod structure. In this way, the ESD current flows along a controlled path instead of jumping to arbitrary locations, which protects nearby susceptible circuitry.

In aspects, a camera module for an electronic device is disclosed. The camera module includes a camera lens and an image sensor aligned with the camera lens. The camera module also includes a retainer encircling the camera lens. The retainer is movable during a focus tuning of the camera module. The camera module further includes an ESD bridge component arranged to provide a controlled path for an electrostatic discharge current to travel from the retainer to a system ground of the electronic device. In implementations, the ESD bridge component is separated from the retainer by a gap and positioned to guide the ESD current away from the image sensor.

In aspects, an electronic device is disclosed. The electronic device includes a housing, a system ground, and an IR cover disposed on an exterior surface of the housing. In some implementations, at least a portion of the infrared cover is configured to be substantially transparent to infrared light. Further, the infrared cover is separate from the retainer and has an aperture through which the retainer extends. The electronic device also includes one or more infrared light sources disposed within the housing behind the infrared cover and configured to generate infrared light that is directed through the infrared cover. In addition, the electronic device includes a camera module as disclosed above.

This summary is provided to introduce simplified concepts of a camera module with ESD protection, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of a camera module with ESD protection are described in this document with reference to the following drawings. The same numbers are used throughout the drawings to reference like features and components.

DETAILED DESCRIPTION

The present document describes a camera module with ESD protection. In particular, the camera module of an electronic device includes an ESD bridging component (also referred to as a lightning rod structure), which guides the ESD current to the system ground of the electronic device by acting as a bridge between a metal, movable, lens retainer and a heat sink. The ESD bridging component is separated from the lens retainer by a gap to avoid impacting camera focus tuning and risking audio rub and buzz. When the lens retainer is stressed by an ESD spark (e.g., an electrostatically charged person touches the lens retainer or touches some location on the electronic device), a conductive path is established across the gap from the retainer to the ESD bridging component and further to the heat sink, which is safely grounded. In this way, the ESD current flows along a controlled path instead of jumping to arbitrary locations, thereby protecting nearby circuitry that is sensitive to ESD current.

Implementing the described techniques enables a more robust structure for a small form factor device (e.g., video-recording doorbell) because the described techniques provide ESD protection without requiring the use of TVS diodes in the nearby circuitry. Thus, component costs and space requirements are reduced, resulting in lower manufacturing costs and a smaller or thinner device.

While features and concepts of the described techniques for a camera module with ESD protection can be implemented in any number of different environments, aspects are described in the context of the following examples.

Example Environments and Devices

Figure 1A:
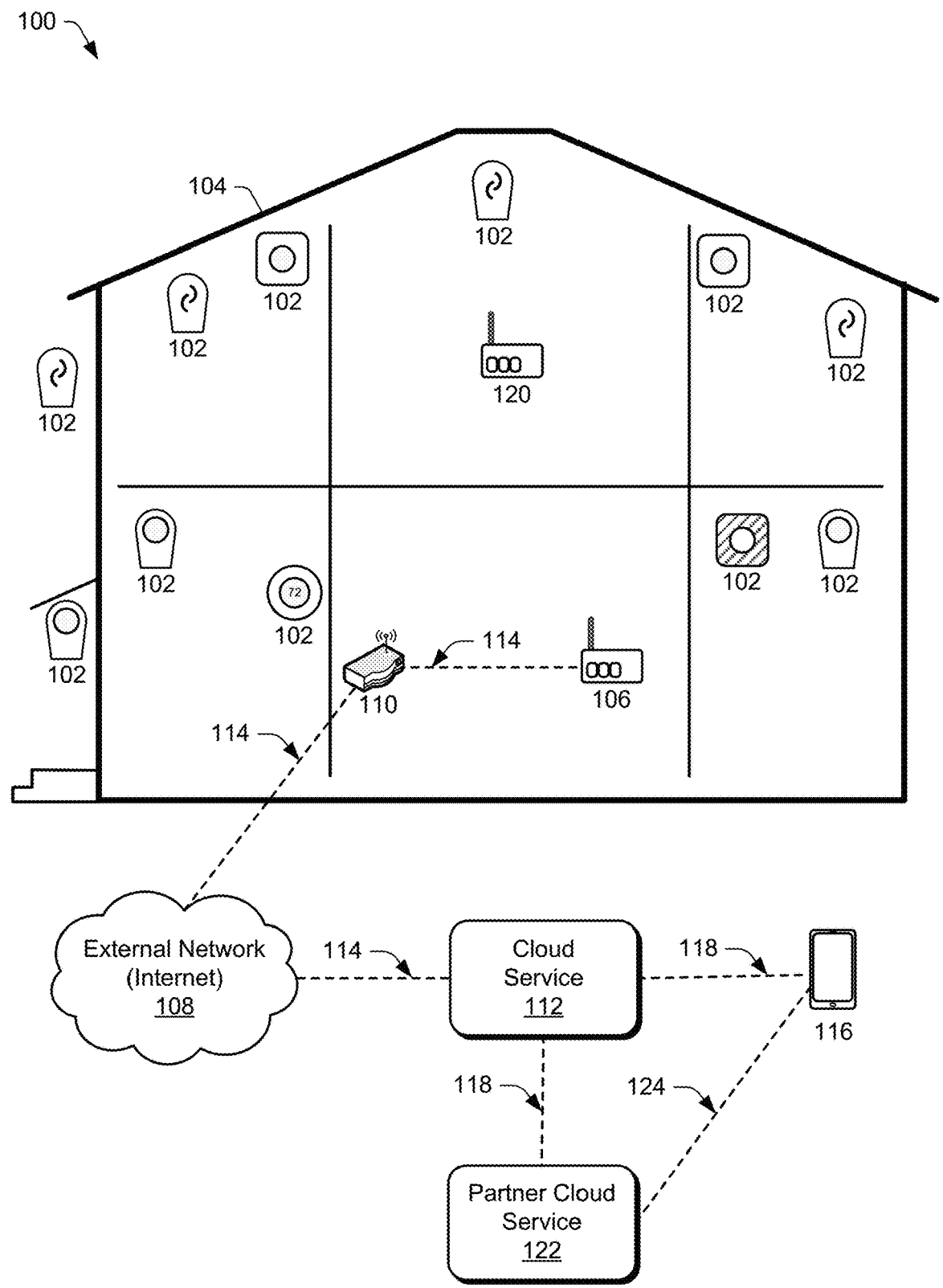
FIG. 1A is an example network environment in which various aspects of a camera module with ESD protection can be implemented.

FIG. 1A illustrates an example network environment 100 (e.g., network environment) in which a camera module with ESD protection can be implemented. The network environment 100 includes a home area network (HAN). The HAN includes wireless network devices 102 (e.g., electronic devices) that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via a border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy-management hub, a heating, ventilation, and air conditioning (HVAC) hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 1B:
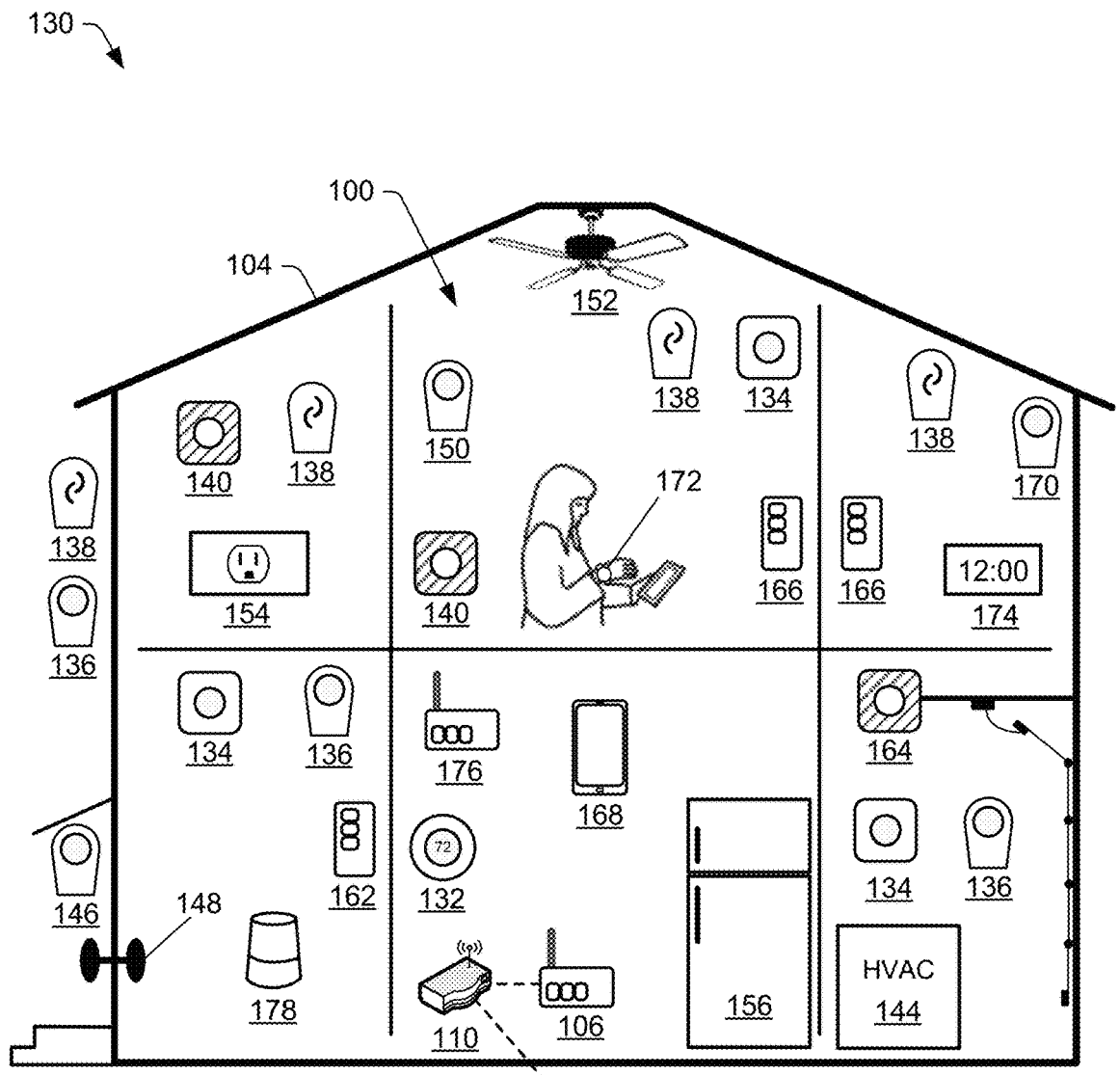
FIG. 1B illustrates the example environment in FIG. 1A in more detail.
Figure 1B:
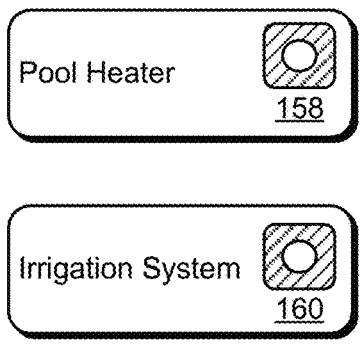
Figure 1B:
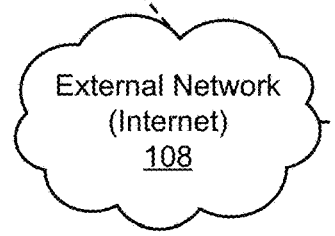

FIG. 1B illustrates an example environment 130 in which a home area network, as described with reference to FIG. 1A, and aspects of a camera module with ESD protection can be implemented. Generally, the environment 100 includes the home area network (HAN) implemented as part of a home or other type of structure with any number of wireless network devices (e.g., wireless network devices 102) that are configured for communication in a wireless network. For example, the wireless network devices can include a thermostat 132, hazard detectors 134 (e.g., for smoke and/or carbon monoxide), cameras 136 (e.g., indoor and outdoor), lighting units 138 (e.g., indoor and outdoor), and any other types of wireless network devices 140 that are implemented inside and/or outside of a structure 142 (e.g., in a home environment). In this example, the wireless network devices can also include any of the previously described devices, such as a border router 106, as well as the electronic device 202.

In the environment 100, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 6.

In implementations, the thermostat 132 may include a Nest® Learning Thermostat that detects ambient climate characteristics (e.g., temperature and/or humidity) and controls an HVAC system 144 in the home environment. The learning thermostat 132 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 134 can be implemented to detect the presence of a hazardous substance or a substance indicative of a hazardous substance (e.g., smoke, fire, or carbon monoxide). In examples of wireless interconnection, a hazard detector 134 may detect the presence of smoke, indicating a fire in the structure, in which case the hazard detector that first detects the smoke can broadcast a low-power wake-up signal to all of the connected wireless network devices. The other hazard detectors 134 can then receive the broadcast wake-up signal and initiate a high-power state for hazard detection and to receive wireless communications of alert messages. Further, the lighting units 138 can receive the broadcast wake-up signal and activate in the region of the detected hazard to illuminate and identify the problem area. In another example, the lighting units 138 may activate in one illumination color to indicate a problem area or region in the structure, such as for a detected fire or break-in, and activate in a different illumination color to indicate safe regions and/or escape routes out of the structure.

In various configurations, the wireless network devices 140 can include an entryway interface device 146 that functions in coordination with a network-connected door lock system 148, and that detects and responds to a person's approach to or departure from a location, such as an outer door of the structure 142. The entryway interface device 146 can interact with the other wireless network devices based on whether someone has approached or entered the smart-home environment. An entryway interface device 146 can control doorbell functionality, announce the approach or departure of a person via audio or visual means, and control settings on a security system, such as to activate or deactivate the security system when occupants come and go. The wireless network devices 140 can also include other sensors and detectors, such as to detect ambient lighting conditions, detect room-occupancy states (e.g., with an occupancy sensor 150), and control a power and/or dim state of one or more lights. In some instances, the sensors and/or detectors may also control a power state or speed of a fan, such as a ceiling fan 152. Further, the sensors and/or detectors may detect occupancy in a room or enclosure and control the supply of power to electrical outlets or devices 154, such as if a room or the structure is unoccupied.

The wireless network devices 140 may also include connected appliances and/or controlled systems 156, such as refrigerators, stoves and ovens, washers, dryers, air conditioners, pool heaters 158, irrigation systems 160, security systems 162, and so forth, as well as other electronic and computing devices, such as televisions, entertainment systems, computers, intercom systems, garage-door openers 164, ceiling fans 152, control panels 166, and the like. When plugged in, an appliance, device, or system can announce itself to the home area network as described above and can be automatically integrated with the controls and devices of the home area network, such as in the home. It should be noted that the wireless network devices 140 may include devices physically located outside of the structure, but within wireless communication range, such as a device controlling a swimming pool heater 158 or an irrigation system 160.

As described above, the HAN includes a border router 106 that interfaces for communication with an external network, outside the HAN. The border router 106 connects to an access point 110, which connects to the external network 108, such as the Internet. A cloud service 112, which is connected via the external network 108, provides services related to and/or using the devices within the HAN. By way of example, the cloud service 112 can include applications for connecting end-user devices 168, such as smartphones, tablets, and the like, to devices in the home area network, processing and presenting data acquired in the HAN to end-users, linking devices in one or more HANs to user accounts of the cloud service 112, provisioning and updating devices in the HAN, and so forth. For example, a user can control the thermostat 132 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, and so on).

Any of the wireless network devices in the HAN can serve as low-power and communication nodes to create the HAN in the home environment. Individual low-power nodes of the network can regularly send out messages regarding what they are sensing, and the other low-powered nodes in the environment-in addition to sending out their own messages—can repeat the messages, thereby communicating the messages from node to node (e.g., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, the occupancy sensor 150 and/or an ambient light sensor 170 can detect an occupant in a room as well as measure the ambient light, and activate the light source when the ambient light sensor 170 detects that the room is dark and when the occupancy sensor 150 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (e.g., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 138 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 138 that lead to a safe exit. The light units 138 may also be turned on to indicate the direction along an exit route that a person should travel to safely exit the structure.

The various wireless network devices may also be implemented to integrate and communicate with wearable computing devices 172, such as may be used to identify and locate an occupant of the structure and adjust the temperature, lighting, sound system, and the like accordingly. In other implementations, radio frequency identification (RFID) sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques may draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 140 may also include a network-connected alarm clock 174 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 132 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 132 so as to pre-heat or cool the environment to a desired setting and turning on or turning off the lighting units 138.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 100 may include one or more wireless network devices that function as a hub 176. The hub 176 (e.g., hub 120) may be a general-purpose home automation hub, or an application-specific hub, such as a security hub, an energy management hub, an HVAC hub, and so forth. The functionality of a hub 176 may also be integrated into any wireless network device, such as a network-connected thermostat device or the border router 106. Hosting functionality on the hub 176 in the structure 142 can improve reliability when the user's internet connection is unreliable, can reduce latency of operations that would normally have to connect to the cloud service 112, and can satisfy system and regulatory constraints around local access between wireless network devices.

Additionally, the example environment 100 includes a network-connected-speaker 178. The network-connected speaker 178 provides voice assistant services that include providing voice control of network-connected devices. The functions of the hub 176 may be hosted in the network-connected speaker 178. The network-connected speaker 178 can be configured to communicate via the HAN, which may include a wireless mesh network, a Wi-Fi network, or both.

Figure 2A:
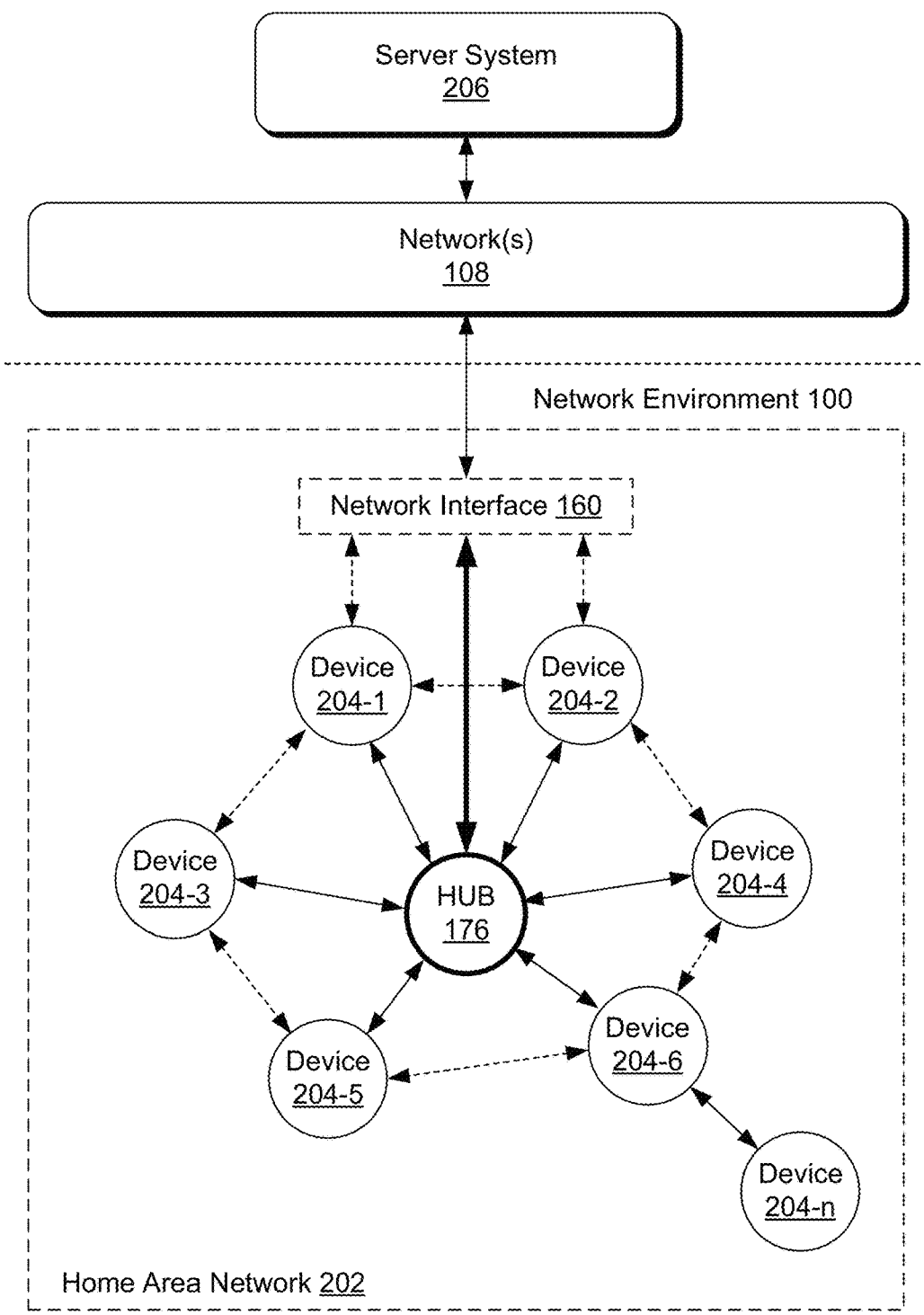
FIG. 2A illustrates an example home area network system in which various aspects of a camera module with ESD protection can be implemented.

FIG. 2A is a block diagram illustrating a representative network architecture 200 that includes a home area network 202 (HAN 202) in accordance with some implementations. In some implementations, electronic devices 204 (e.g., wireless network devices 102) in the network environment 100 combine with the hub 176 to create a mesh network in the HAN 202. In some implementations, one or more of the smart devices 204 in the HAN 202 operate as a smart home controller. Additionally and/or alternatively, the hub 176 may operate as the smart home controller. In some implementations, a smart home controller has more computing power than other smart devices. The smart home controller can process inputs (e.g., from smart devices 204, end user devices 168, and/or server system 206) and send commands (e.g., to smart devices 204 in the HAN 202) to control operation of the network environment 100. In aspects, some of the smart devices 204 in the HAN 202 (e.g., in the mesh network) are "spokesman" nodes (e.g., 204-1, 204-2) and others are "low-powered" nodes (e.g., 204-*n*). Some of the smart devices in the network environment 100 may be battery-powered, while others may have a regular and reliable power source, such as via line power (e.g., to 120V line voltage wires). The smart devices that have a regular and reliable power source are referred to as "spokesman" nodes. These nodes are typically equipped with the capability of using a wireless protocol to facilitate bidirectional communication with a variety of other devices in the network environment 100, as well as with the server system 206 (e.g., cloud service 112, partner cloud service 122). In some implementations, one or more "spokesman" nodes operate as a smart home controller. On the other hand, the devices that are battery-powered are the "low-power" nodes. These nodes tend to be smaller than spokesman nodes and typically only communicate using wireless protocols that require very little power, such as Zigbee, ZWave, 6LoWPAN, Thread, Bluetooth, etc.

Some low-power nodes may be incapable of bidirectional communication. These low-power nodes send messages but are unable to "listen". Thus, other devices in the network environment 100, such as the spokesman nodes, cannot send information to these low-power nodes.

Some low-power nodes may be capable of only a limited bidirectional communication. As a result of such limited bidirectional communication, other devices may be able to communicate with these low-power nodes only during a certain time period.

As described, in some implementations, the smart devices serve as low-power and spokesman nodes to create a mesh network in the network environment 100. In some implementations, individual low-power nodes in the network environment regularly send out messages regarding what they are sensing, and the other low-powered nodes in the network environment-in addition to sending out their own messages-forward the messages, thereby causing the messages to travel from node to node (e.g., device to device) throughout the HAN 202. In some implementations, the spokesman nodes in the HAN 202, which are able to communicate using a relatively high-power communication protocol (e.g., IEEE 802.11), are able to switch to a relatively low-power communication protocol (e.g., IEEE 802.15.4) to receive these messages, translate the messages to other communication protocols, and send the translated messages to other spokesman nodes and/or the server system 206 (using, e.g., the relatively high-power communication protocol). Thus, the low-powered nodes using low-power communication protocols are able to send and/or receive messages across the entire HAN 202, as well as over the Internet (e.g., network 108) to the server system 206. In some implementations, the mesh network enables the server system 206 to regularly receive data from most or all of the smart devices in the home, make inferences based on the data, facilitate state synchronization across devices within and outside of the HAN 202, and send commands to one or more of the smart devices to perform tasks in the network environment.

As described, the spokesman nodes and some of the low-powered nodes are capable of "listening." Accordingly, users, other devices, and/or the server system 206 may communicate control commands to the low-powered nodes. For example, a user may use the end user device 168 (e.g., a smart phone) to send commands over the Internet to the server system 206, which then relays the commands to one or more spokesman nodes in the HAN 202. The spokesman nodes may use a low-power protocol to communicate the commands to the low-power nodes throughout the HAN 202, as well as to other spokesman nodes that did not receive the commands directly from the server system 206.

In some implementations, a lighting unit 138 (FIG. 1B), which is an example of a smart device 204, may be a low-power node. In addition to housing a light source, the lighting unit 138 may house an occupancy sensor (e.g., occupancy sensor 150), such as an ultrasonic or passive IR sensor, and an ambient light sensor (e.g., ambient light sensor 170), such as a photo resistor or a single-pixel sensor that measures light in the room. In some implementations, the lighting unit 138 is configured to activate the light source when its ambient light sensor detects that the room is dark and when its occupancy sensor detects that someone is in the room. In other implementations, the lighting unit 138 is simply configured to activate the light source when its ambient light sensor detects that the room is dark. Further, in some implementations, the lighting unit 138 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (e.g., smart device to smart device) within the HAN 202 as well as over the Internet 162 to the server system 206.

Other examples of low-power nodes include battery-operated versions of the hazard detectors 134. These hazard detectors 134 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, hazard detectors 134 may send messages that correspond to each of the respective sensors to the other devices and/or the server system 206, such as by using the mesh network as described above.

Examples of spokesman nodes include entryway interface devices 146 (e.g., smart doorbells), thermostats 132, control panels 166, electrical outlets 154, and other wireless network devices 140. These devices are often located near and connected to a reliable power source, and therefore may include more power-consuming components, such as one or more communication chips capable of bidirectional communication in a variety of protocols.

In some implementations, the network environment 100 includes controlled systems 156, such as service robots, that are configured to carry out, in an autonomous manner, any of a variety of household tasks.

As explained with reference to FIG. 1B, in some implementations, the network environment 100 includes a hub device (e.g., hub 176) that is communicatively coupled to the network(s) 108 directly or via a network interface 208 (e.g., access point 110). The hub 176 is further communicatively coupled to one or more of the smart devices 204 using a radio communication network that is available at least in the network environment 100. Communication protocols used by the radio communication network include, but are not limited to, ZigBee, Z-Wave, Insteon, EuOcean, Thread, OSIAN, Bluetooth Low Energy, and the like. In some implementations, the hub 176 not only converts the data received from each smart device to meet the data format requirements of the network interface 208 or the network(s) 108, but also converts information received from the network interface 208 or the network(s) 108 to meet the data format requirements of the respective communication protocol associated with a targeted smart device. In some implementations, in addition to data format conversion, the hub 176 further processes the data received from the smart devices or information received from the network interface 208 or the network(s) 108 preliminary. For example, the hub 176 can integrate inputs from multiple sensors/connected devices (including sensors/devices of the same and/or different types), perform higher-level processing on those inputs—e.g., to assess the overall environment and coordinate operation among the different sensors/devices—and/or provide instructions to the different devices based on the collection of inputs and programmed processing. It is also noted that in some implementations, the network interface 208 and the hub 176 are integrated into one network device. Functionality described herein is representative of particular implementations of smart devices, control application(s) running on representative electronic device(s) (such as a smart phone), hub(s) 176, and server system(s) 206 coupled to hub(s) 176 via the Internet or other Wide Area Network. All or a portion of this functionality and associated operations can be performed by any elements of the described system—for example, all or a portion of the functionality described herein as being performed by an implementation of the hub can be performed, in different system implementations, in whole or in part on the server, one or more connected smart devices and/or the control application, or different combinations thereof.

Figure 2B:
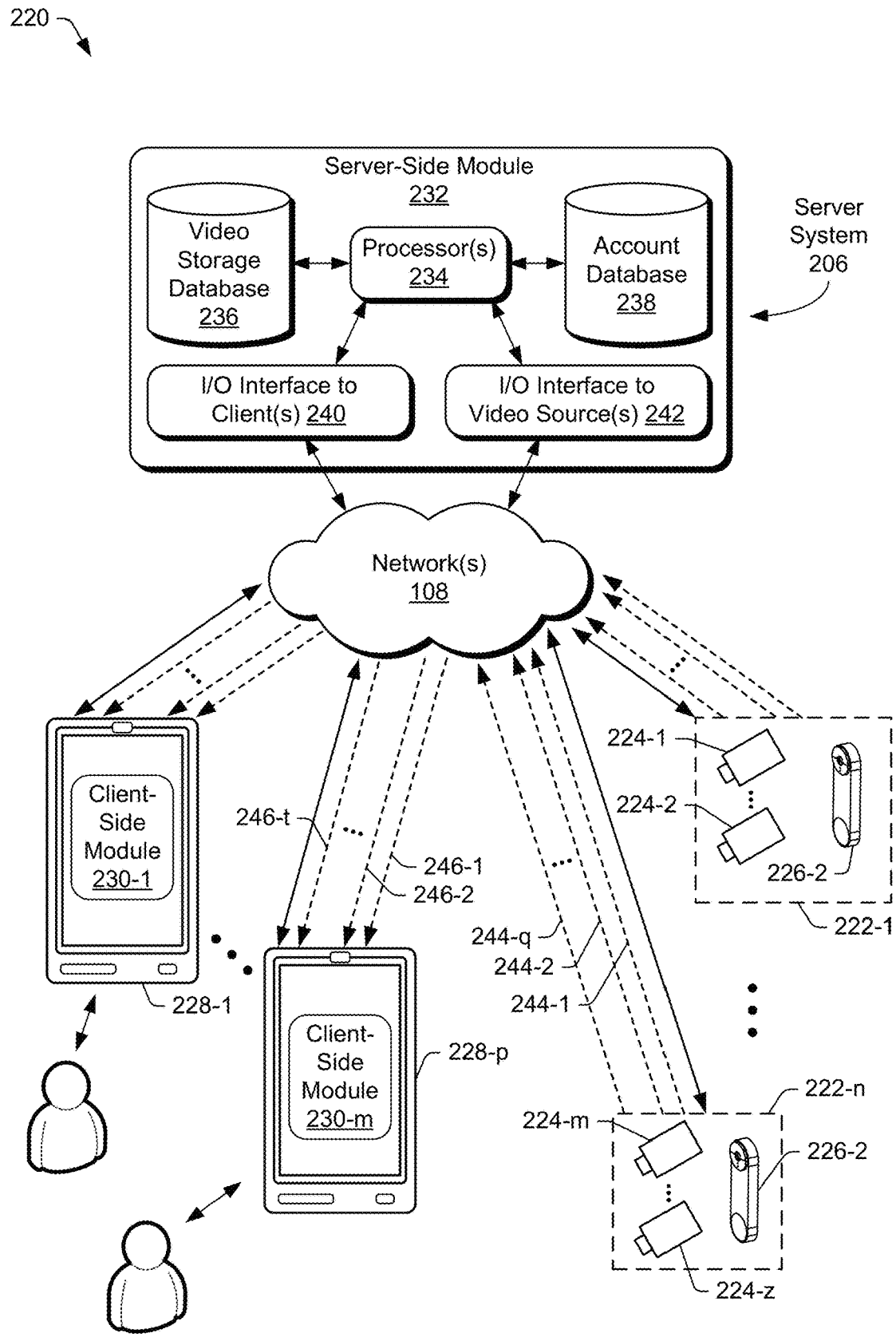
FIG. 2B illustrates an example operating environment in which a server system interacts with client devices and smart devices in accordance with some implementations.

FIG. 2B illustrates a representative operating environment 220 in which a server system 206 provides data processing for monitoring and facilitating review of events (e.g., motion, audio, security, etc.) in video streams captured by cameras 136 (e.g., video cameras, doorbell cameras). As shown in FIG. 2B, the server system 206 receives video data from video sources 222 (including video cameras 224 or video-recording doorbells 226) located at various physical locations (e.g., inside or in proximity to homes, restaurants, stores, streets, parking lots, and/or the network environments 100 of FIG. 1). Each video source 222 may be linked to one or more reviewer accounts, and the server system 206 provides video monitoring data for the video source 222 to client devices 228 associated with the reviewer accounts. For example, the portable end user device 168 is an example of the client device 228. In some implementations, the server system 206 is a video processing server that provides video processing services to the video sources and client devices 228.

In some implementations, the server system 206 receives non-video data from one or more smart devices 204 (e.g., audio data, metadata, numerical data, etc.). The non-video data may be analyzed to provide context for motion events detected by the video cameras 224 and/or the video-recording doorbells 226. In some implementations, the non-video data indicates that an audio event (e.g., detected by an audio device such as an audio sensor integrated into the network-connected speaker 178), a security event (e.g., detected by a perimeter monitoring device such as the camera 136 and/or a motion sensor), a hazard event (e.g., detected by the hazard detector 134), medical event (e.g., detected by a health-monitoring device), or the like has occurred within a network environment 100.

In some implementations, multiple reviewer accounts are linked to a single network environment 100. For example, multiple occupants of a network environment 100 may have accounts liked to the network environment 100. In some implementations, each reviewer account is associated with a particular level of access. In some implementations, each reviewer account has personalized notification settings. In some implementations, a single reviewer account is linked to multiple network environments 100 (e.g., multiple different HANs). For example, a person may own or occupy, or be assigned to review and/or govern, multiple network environments 100. In some implementations, the reviewer account has distinct levels of access and/or notification settings for each network environment.

In some implementations, each of the video sources 222 includes one or more video cameras 224 or video-recording doorbells 226 that capture video and send the captured video to the server system 206 substantially in real-time. In some implementations, each of the video sources 222 includes one or more doorbells 226 that capture video and send the captured video to the server system 206 in real-time (e.g., within 1 second, 10 seconds, 30 seconds, or 1 minute). Each of the doorbells 226 may include a video camera that captures video and sends the captured video to the server system 206 in real-time. In aspects, a video source 222 includes a controller device (not shown) that serves as an intermediary between the one or more doorbells 226 and the server system 206. The controller device receives the video data from the one or more doorbells 226, optionally performs some preliminary processing on the video data, and sends the video data and/or the results of the preliminary processing to the server system 206 on behalf of the one or more doorbells 226 (e.g., in real-time). In some implementations, each camera has its own on-board processing capabilities to perform some preliminary processing on the captured video data before sending the video data (e.g., along with metadata obtained through the preliminary processing) to the controller device and/or the server system 206. In some implementations, one or more of the cameras is configured to, optionally, locally store the video data (e.g., for later transmission if requested by a user). In some implementations, a camera is configured to perform some processing of the captured video data and, based on the processing, either send the video data in substantially real-time, store the video data locally, or disregard the video data.

In accordance with some implementations, a client device 228 includes a client-side module 230. In some implementations, the client-side module communicates with a server-side module 232 executed on the server system 206 through the one or more networks 108. The client-side module provides client-side functionality for the event monitoring and review processing and communications with the server-side module. The server-side module provides server-side functionality for event monitoring and review processing for any number of client-side modules each residing on a respective client device 228 (e.g., any one of client devices 228-1 to 228-m). In some implementations, the server-side module 232 also provides server-side functionality for video processing and camera control for any number of the video sources 222, including any number of control devices, cameras 136, and doorbells 226.

In some implementations, the server system 206 includes one or more processors 234, a video storage database 236, an account database 238, an input/output (I/O) interface 240 to one or more client devices 228, and an I/O interface 242 to one or more video sources 222. The I/O interface 242 to one or more client devices 228 facilitates the client-facing input and output processing. The account database 238 stores a plurality of profiles for reviewer accounts registered with the video processing server, where a respective user profile includes account credentials for a respective reviewer account, and one or more video sources linked to the respective reviewer account. The I/O interface 242 to one or more video sources 218 facilitates communications with one or more video sources 222 (e.g., groups of one or more doorbells 226, cameras 136, and associated controller devices). The video storage database 236 stores raw video data received from the video sources 222, as well as various types of metadata, such as motion events, event categories, event categorization models, event filters, and event masks, for use in data processing for event monitoring and review for each reviewer account.

Examples of a representative client device 228 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 108 include local area networks (LAN) and wide area networks (WAN) such as the Internet. The one or more networks 108 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 206 is implemented on one or more standalone data processing apparatuses or a distributed network of computers. The server system 206 may also employ various virtual devices and/or services of third-party service providers (e.g., third-party cloud service providers) to provide the underlying computing resources and/or infrastructure resources of the server system 206. In some implementations, the server system 206 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of the operating environment can vary in different implementations. Similarly, the division of functionality between a video source 222 and the server system 206 can vary in different implementations. For example, in some implementations, the client-side module is a thin client that provides only user-facing input and output processing functions, and delegates all other data processing functionality to a backend server (e.g., the server system 206). Similarly, in some implementations, a respective one of the video sources 222 is a simple video capturing device that continuously captures and streams video data to the server system 206 with limited or no local preliminary processing on the video data. Although many aspects of the present technology are described from the perspective of the server system 206, the corresponding actions performed by a client device 228 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 206, a client device 228, and a video source 222 cooperatively.

In some aspects, a video source 222 (e.g., a video camera 224 or a doorbell 226 having an image sensor) transmits one or more streams 244 of video data to the server system 206. In some implementations, the one or more streams include multiple streams, having respective resolutions and/or frame rates, of the raw video captured by the image sensor. In some implementations, the multiple streams include a "primary" stream (e.g., 244-1) with a certain resolution and frame rate, corresponding to the raw video captured by the image sensor, and one or more additional streams (e.g., 244-2 through 244-q). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 244 is sent from the video source 222 directly to a client device 228 (e.g., without being routed to, or processed by, the server system 206). In some implementations, one or more of the streams is stored at a local memory of the doorbell 226 and/or at a local storage device (e.g., a dedicated recording device), such as a digital video recorder (DVR). For example, in accordance with some implementations, the doorbell 226 stores the most-recent 24 hours of video footage recorded by the camera. In some implementations, portions of the one or more streams are stored at the doorbell 226 and/or the local storage device (e.g., portions corresponding to particular events or times of interest).

In some implementations, the server system 206 transmits one or more streams 246 of video data to a client device 228 to facilitate event monitoring by a user. In some implementations, the one or more streams may include multiple streams, of respective resolutions and/or frame rates, of the same video feed. In some implementations, the multiple streams include a "primary" stream (e.g., 246-1) with a certain resolution and frame rate, corresponding to the video feed, and one or more additional streams (e.g., 246-2 through 246-t). An additional stream may be the same video stream as the "primary" stream but at a different resolution and/or frame rate, or a stream that shows a portion of the "primary" stream (e.g., cropped to include a portion of the field of view or pixels of the primary stream) at the same or different resolution and/or frame rate as the "primary" stream.

Figure 3:
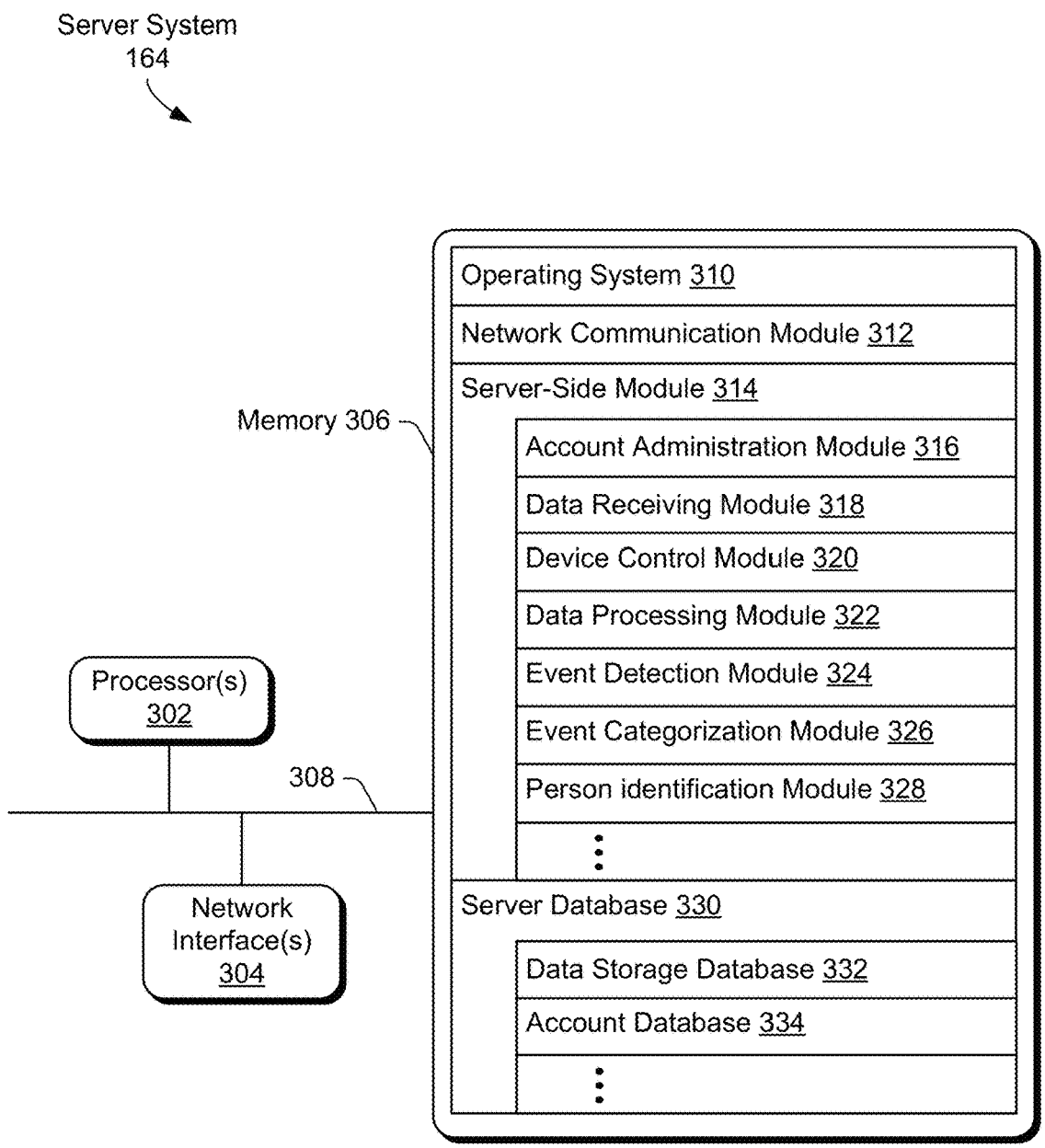
FIG. 3 is a block diagram illustrating an example video server system, in accordance with some implementations.

FIG. 3 is a block diagram illustrating the server system 206 in accordance with some implementations. The server system 206 typically includes one or more processors 302, one or more network interfaces 304 (e.g., including the I/O interface 240 to one or more client devices and the I/O interface 242 to one or more electronic devices), memory 306, and one or more communication buses 308 for interconnecting these components (sometimes called a chipset). The memory 306 includes high-speed random access memory, such as DRAM, SRAM, DDR SRAM, or other random access solid-state memory devices; and, optionally, includes non-volatile memory, such as one or more magnetic disk storage devices, one or more optical disk storage devices, one or more flash memory devices, or one or more other non-volatile solid-state storage devices. The memory 306, optionally, includes one or more storage devices remotely located from one or more of the processors 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 206 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
  - an account administration module 316 for creating reviewer accounts, performing camera registration processing to establish associations between video sources to their respective reviewer accounts, and providing account login services to the client devices 228;
  - a data receiving module 316 for receiving data from electronic devices (e.g., video data from a video source 222 in FIG. 2B), and preparing the received data for further processing and storage in a data storage database (e.g., data storage database 332);
  - a device control module 320 for generating and sending server-initiated control commands to modify operation modes of electronic devices (e.g., devices of a network environment 100), and/or receiving (e.g., from client devices 228) and forwarding user-initiated control commands to modify operation modes of the electronic devices;
  - a data processing module 322 for processing the data provided by the electronic devices, and/or preparing and sending processed data to a device for review (e.g., client devices 228 for review by a user;
  - an event detection module 324 for detecting motion event candidates in video streams from each of the video sources 222, including motion track identification, false positive suppression, and event mask generation and caching;
  - an event categorization module 326 for categorizing motion events detected in received video streams; and
  - a person identification module 328 for identifying characteristics associated with presence of humans in the received video streams; and
- a server database 330, which provides server-side storage data associated with device control, data processing, and data review, including but not limited to:
  - a data storage database 332 for storing data (e.g., raw/processed image data) associated with each electronic device (e.g., each video source 222) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub 176 or smart devices are stored securely; and
  - an account database 334 for storing account information for user accounts, including user account information such as user profiles, information and settings for linked hub devices and electronic devices (e.g., hub device identifications), hub device-specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., a media access control (MAC) address and universally unique identifier (UUID)), device-specific secrets, and displayed titles.

Each of the above-identified elements may be stored in one or more of the previously mentioned memory devices and may correspond to a set of instructions for performing a function described above. The above-identified modules or programs (e.g., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 4:
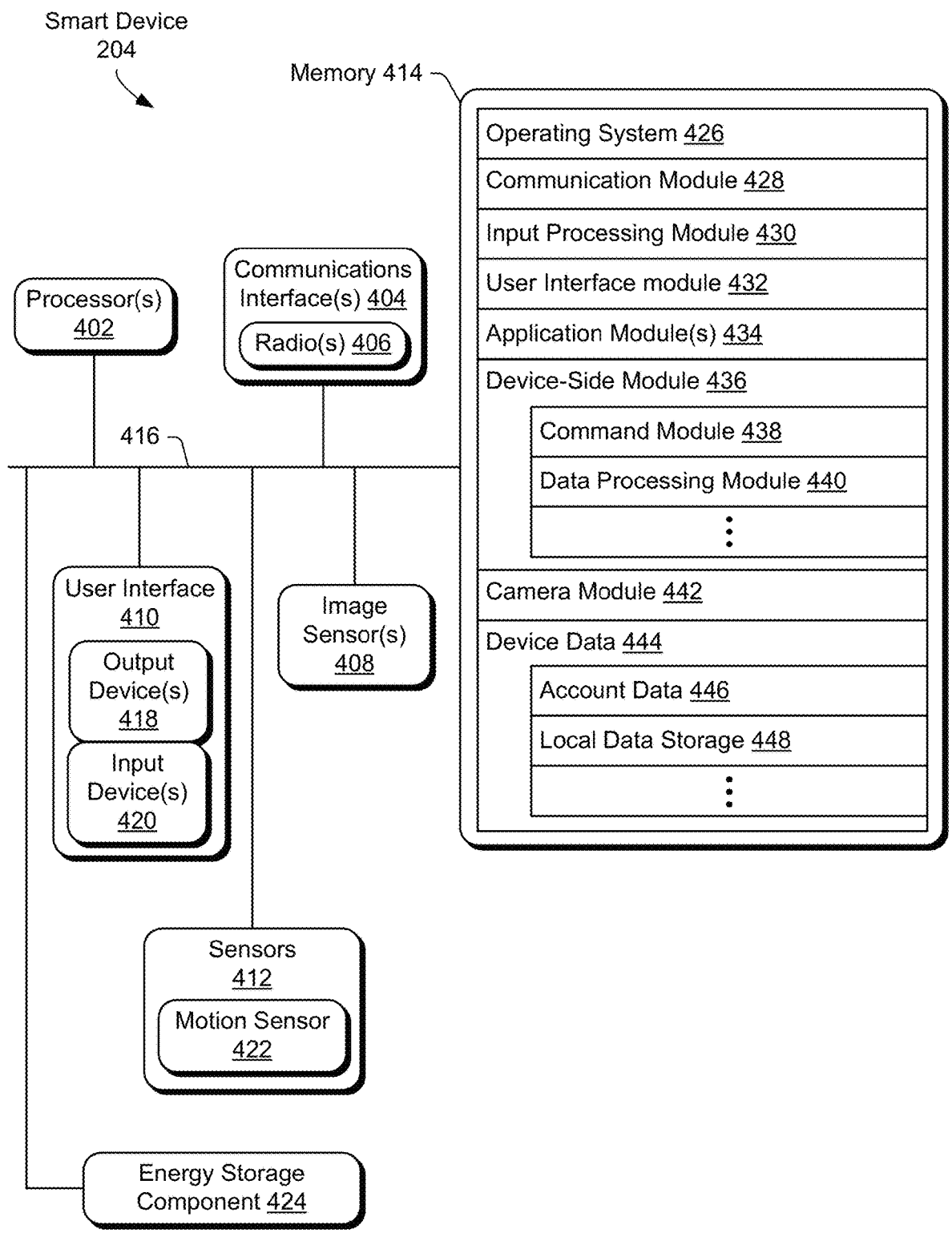
FIG. 4 is a block diagram illustrating an example smart device, in accordance with some implementations.

FIG. 4 is a block diagram illustrating an example smart device 204 in accordance with some implementations. In some implementations, the smart device 204 (e.g., any device of the network environment 100 in FIG. 1, including end user device 168) includes one or more processors 402 (e.g., CPUs, ASICs, FPGAs, microprocessors, and the like), one or more communication interfaces 404 with radios 406, image sensor(s) 408, user interfaces(s) 410, sensor(s) 412, memory 414, and one or more communication buses 416 for interconnecting these components (sometimes called a chipset). In some implementations, the user interface 410 includes one or more output devices 418 that enable presentation of media content, including one or more speakers and/or one or more visual displays. In some implementations, the user interface 410 includes one or more input devices 420, including user interface components that facilitate user input such as a keyboard, a mouse, a voice-command input unit or microphone, a touch screen display, a touch-sensitive input pad, a gesture capturing camera, or other input buttons or controls. In some implementations, an input device 420 for a doorbell 226 is a tactile or touch-sensitive doorbell button. Furthermore, some smart devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 422, location sensors (e.g., GPS sensors), accelerometers, and/or gyroscopes.

In some implementations, the smart device 204 includes an energy storage component 424 (e.g., one or more batteries and/or capacitors). In some implementations, the energy storage component 424 includes a power management integrated circuit (IC). In some implementations, the energy storage component 424 includes circuitry to harvest energy from signals received via an antenna (e.g., the radios 406) of the smart device. In some implementations, the energy storage component 424 includes circuitry to harvest thermal, vibrational, electromagnetic, and/or solar energy received by the smart device. In some implementations, the energy storage component 424 includes circuitry to monitor a stored energy level and adjust operation and/or generate notifications based on changes to the stored energy level.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. The radios 406 enable one or more radio communication networks in the network environments 100, and enable a smart device 204 to communicate with other devices. In some implementations, the radios 406 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 414 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. The memory 414, or alternatively the non-volatile memory within the memory 414, includes a non-transitory computer-readable storage medium. In some implementations, the memory 414, or the non-transitory computer-readable storage medium of the memory 414, stores the following programs, modules, and data structures, or a subset or superset thereof:

- operating system 426 including procedures for handling various basic system services and for performing hardware dependent tasks;
- a communication module 428 for coupling to and communicating with other network devices (e.g., a network interface 208, such as a router that provides Internet connectivity, networked storage devices, network routing devices, a server system 206, other smart devices 204, client devices 228, etc.) connected to one or more networks 108 via one or more communication interfaces 404 (wired or wireless);
- an input processing module 430 for detecting one or more user inputs or interactions from the one or more input devices 420 and interpreting the detected inputs or interactions;
- a user interface module 432 for providing and presenting a user interface in which settings, captured data, and/or other data for one or more devices (e.g., the smart device 204, and/or other devices in a network environment 100) can be configured and/or viewed;
- one or more applications 434 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- a device-side module 436, which provides device-side functionalities for device control, data processing and data review, including but not limited to:
  - a command module 438 for receiving, forwarding, and/or executing instructions and control commands (e.g., from a client device 228, from a server system 206, from user inputs detected on the user interface 410, etc.) for operating the smart device 204; and
  - a data processing module 440 for processing data captured or received by one or more inputs (e.g., input devices 420, image sensor(s) 408, sensors 412, interfaces (e.g., communication interfaces 404, radios 406), and/or other components of the smart device 204, and for preparing and sending processed data to a remote device (e.g., client devices 228) for review by a user;
- a camera module 442 for operating the image sensor(s) 408 and associated circuitry, e.g., for enabling and disabling the image sensor(s) 408 based on data from one or more low-power sensors 412 (e.g., data from a PIR sensor or ALS) and for adjusting encoding of raw image data captured by the image sensor(s) 408 (e.g., adjusting format, resolution, and/or framerate);
- device data 444 storing data associated with devices (e.g., the smart device 204), including, but is not limited to:
  - account data 446 storing information related to user accounts linked to the smart device 204, e.g., including cached login credentials, smart device identifiers (e.g., MAC addresses and UUIDs), user interface settings, display preferences, authentication tokens and tags, password keys, and the like; and
  - local data storage 448 for selectively storing raw or processed data associated with the smart device 204, such as event data and/or video data captured by the image sensor(s) 408.

Each of the above-identified elements may be stored in one or more of the previously mentioned memory devices and correspond to a set of instructions for performing a function described above. The above-identified modules or programs (e.g., sets of instructions) need not be implemented as separate software programs, procedures, or modules, and thus various subsets of these modules may be combined or otherwise rearranged in various implementations. In some implementations, the memory 414, optionally, stores a subset of the modules and data structures identified above. Furthermore, the memory 414, optionally, stores additional modules and data structures not described above, such as a sensor management module for managing operation of the sensor(s) 412.

Figure 5:
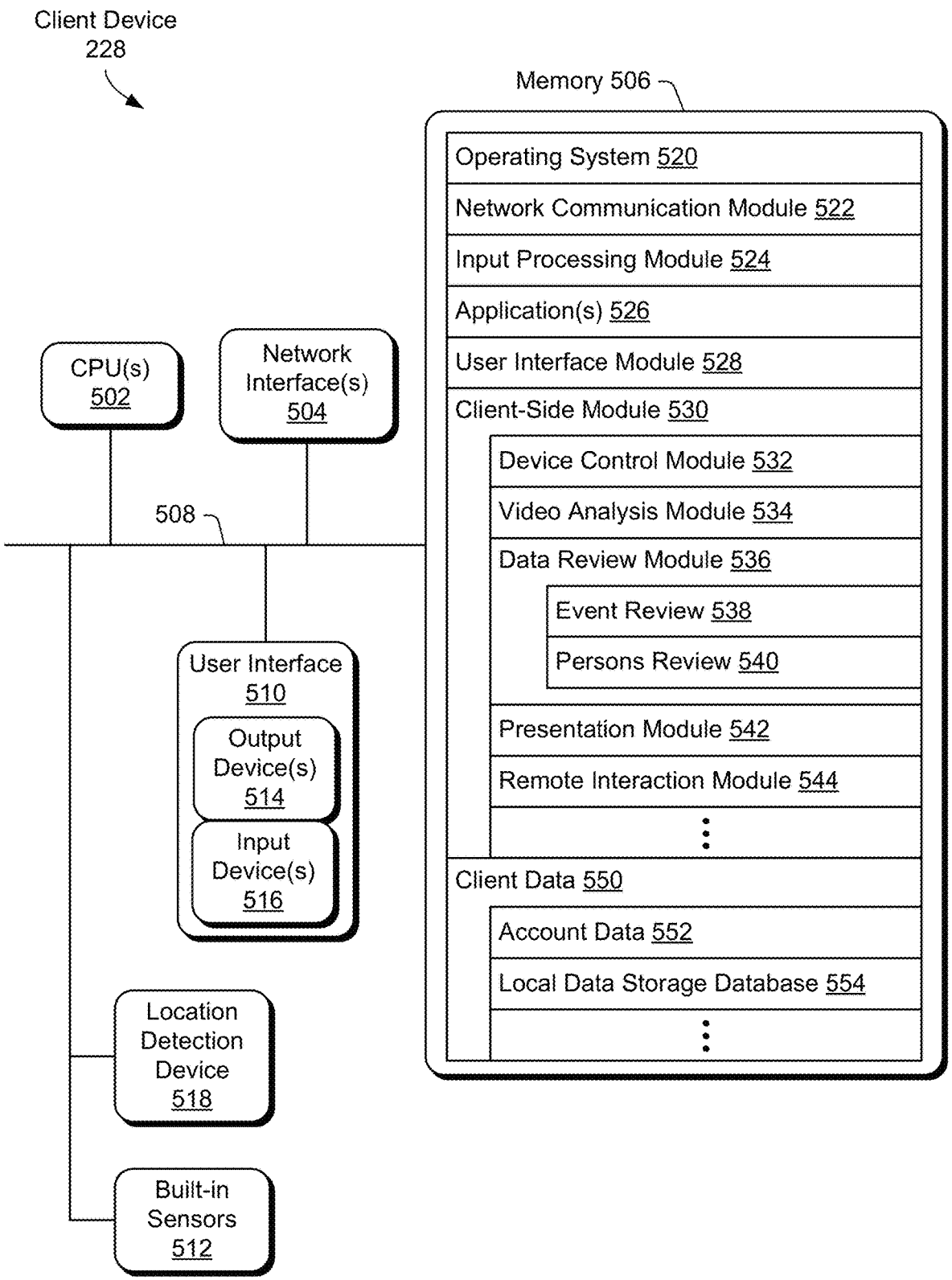
FIG. 5 is a block diagram illustrating an example client device, in accordance with some implementations.

FIG. 5 is a block diagram illustrating a representative client device 228 associated with a user account in accordance with some implementations. The client device 228, typically, includes one or more processing units (CPUs) 502, one or more network interfaces 504, memory 506, and one or more communication buses 508 for interconnecting these components (sometimes called a chipset). Optionally, the client device also includes a user interface 510 and one or more built-in sensors 512 (e.g., accelerometer and gyroscope). The user interface 510 includes one or more output devices 514 that enable presentation of media content, including one or more speakers and/or one or more visual displays. The user interface 510 also includes one or more input devices 516, including user interface components that facilitate user input such as a keyboard, a mouse, a voice-command input unit or microphone, a touch screen display, a touch-sensitive input pad, a gesture capturing camera, or other input buttons or controls. Furthermore, some of the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 518, such as a GPS (global positioning satellite) sensor or other geo-location receiver, for determining the location of the client device.

The memory 506 includes high-speed random access memory, such as DRAM, SRAM, DDR SRAM, or other random access solid-state memory devices; and, optionally, includes non-volatile memory, such as one or more magnetic disk storage devices, one or more optical disk storage devices, one or more flash memory devices, or one or more other non-volatile solid-state storage devices. The memory 506, optionally, includes one or more storage devices remotely located from one or more processing units 502. The memory 506, or alternatively the non-volatile memory within the memory 506, includes a non-transitory computer-readable storage medium. In some implementations, the memory 506, or the non-transitory computer-readable storage medium of the memory 506, stores the following programs, modules, and data structures, or a subset or superset thereof:

- an operating system 520 including procedures for handling various basic system services and for performing hardware dependent tasks;
- a network communication module 522 for connecting the client device 228 to other systems and devices (e.g., client devices, electronic devices, and systems connected to one or more networks 108) via one or more network interfaces 504 (wired or wireless);
- an input processing module 524 for detecting one or more user inputs or interactions from one of the one or more input devices 516 and interpreting the detected input or interaction;
- one or more applications 526 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 528 for providing and displaying a user interface in which settings, captured data, and/or other data for one or more devices (e.g., smart devices 204 in network environment 100) can be configured and/or viewed;
- a client-side module 530, which provides client-side functionalities for device control, data processing and data review, including but not limited to:
  - a device control module 532 for generating control commands for modifying an operating mode of smart devices (and optionally other electronic devices) in accordance with user inputs;
  - a video analysis module 534 for analyzing captured video data, e.g., to detect and/or recognize persons, objects, animals, and events, such as described previously with respect to the event analysis module 448;
  - a data review module 536 for providing user interfaces for reviewing data from the server system 206 or video sources 222, including but not limited to:
    - an event review module 538 for reviewing events (e.g., motion and/or audio events), and optionally enabling user edits and/or updates to the events; and
    - a person's review module 540 for reviewing data and/or images regarding detected persons and other entities, and optionally enabling user edits and/or updates to the persons data;
  - a presentation module 542 for presenting user interfaces and response options for interacting with the smart devices 204 and/or the server system 206; and
  - a remote interaction module 544 for interacting with a remote person (e.g., a visitor to the network environment 100), e.g., via a smart device 204 and/or the server system 206; and
- client data 546 storing data associated with the user account and electronic devices, including, but not limited to:
  - account data 548 storing information related to both user accounts loaded on the client device and electronic devices (e.g., of the video sources 222) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - a local data storage database 550 for selectively storing raw or processed data associated with electronic devices (e.g., of the video sources 222, such as a doorbell 226), optionally including entity data described previously.

Each of the above-identified elements may be stored in one or more of the previously mentioned memory devices and may correspond to a set of instructions for performing a function described above. The above-identified modules or programs (e.g., sets of instructions) need not be implemented as separate software programs, procedures, modules, or data structures, and thus various subsets of these modules may be combined or otherwise rearranged in various implementations. In some implementations, the memory 506, optionally, stores a subset of the modules and data structures identified above. Furthermore, the memory 506, optionally, stores additional modules and data structures not described above.

The entities described with respect to FIGS. 1-5 may be further divided, combined, and so on. The environment 100 of FIG. 1 and the detailed illustrations of FIG. 2 through FIG. 12 illustrate some of many possible environments, devices, and methods capable of employing the described techniques, whether individually or in combination with one another.

Example Implementations

Figure 6:
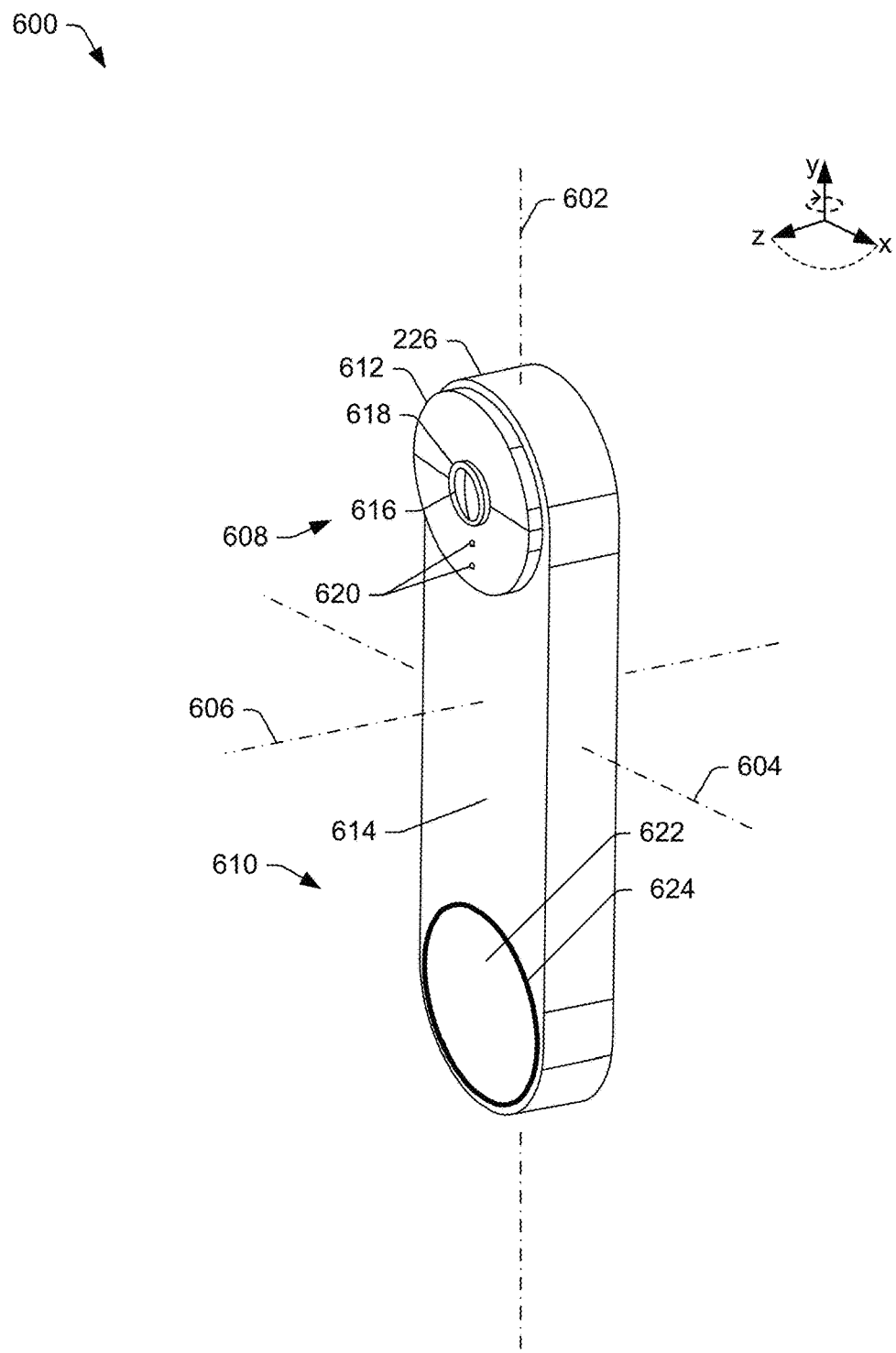
FIG. 6 illustrates an isometric view of an example video-recording doorbell having a camera module, in accordance with some implementations.

FIG. 6 illustrates an isometric view 600 of an example video-recording doorbell (e.g., doorbell 226) having a camera module, in accordance with some implementations. The doorbell 226 is illustrated as having a longitudinal axis 602 (e.g., y-axis), a lateral axis 604 (e.g., x-axis), and a central axis 606 (e.g., z-axis). The doorbell 226 may be elongated along the longitudinal axis such that the doorbell 226 has a height along the longitudinal axis 602 that is significantly greater (at least by a magnitude of two) than a width along the lateral axis 604, and the width is greater than a depth along the central axis 606. The doorbell 226 includes a camera-side end 608 and a button-side end 610. The camera-side end 608 of the doorbell 226 includes an IR cover 612, which includes a portion that is substantially transparent (e.g., 70%, 80%, 90%, 100% transparent) or translucent to IR light and another portion that is substantially opaque (e.g., 70%, 80%, 90%, 100% opaque) to IR light.

In aspects, the IR cover extends outwardly from a first surface 614 (e.g., front surface) of the housing of the doorbell 226. The IR cover 612 forms an annular shape with a center aperture through which a camera lens 616 of the camera module (e.g., camera module 442 in FIG. 4) extends. The annular shape is generally elliptical and, in some cases, where its major and minor axes are equal, the shape is circular. A retainer 618 (e.g., lens retainer) surrounds the camera lens 616 in the xy plane and extends through the center aperture of the IR cover 612 to protrude from an outer surface of the IR cover 612. In this way, the retainer 618 extends outwardly from the housing (and from the IR cover 612) and is exposed to the environment surrounding the doorbell 226. In an example, the retainer 618 has a substantially tubular shape (with an elliptical cross-section or a circular cross-section) and the camera lens 616 is positioned within a center area of the retainer 618. The retainer 618 reduces and/or prevents IR light from leaking into the camera lens 616 through the IR cover 612. The IR light may be provided by IR illuminators (e.g., IR LEDs) disposed behind the IR cover 612 and configured to direct the IR light through one or more apertures 620 in the IR cover 612. Also, the IR light may be received from the ambient environment, through the IR cover, and captured by a sensor (e.g., the image sensor, a passive infrared (PIR) sensor). Accordingly, the retainer 618 prevents the IR light from leaking into the sides or edges of the camera lens 616 from the IR cover 612.

The button-side end 610 of the doorbell 226 includes a button 622, which is pressable by a user to initiate a notification (e.g., chime). In aspects, the button 622 may be surrounded by a light ring 624, which may be substantially flush with the first surface 614 of the doorbell 226. The button 622 and/or light ring 624 may have a shape and/or size that substantially matches the outline and/or size of the IR cover 612. In an example, the button 622 may have a diameter that is substantially equal to the outer diameter of the IR cover 612. In another example, the light ring 624 has an outer diameter that is substantially the same as the outer diameter of the IR cover 612.

Figure 7:
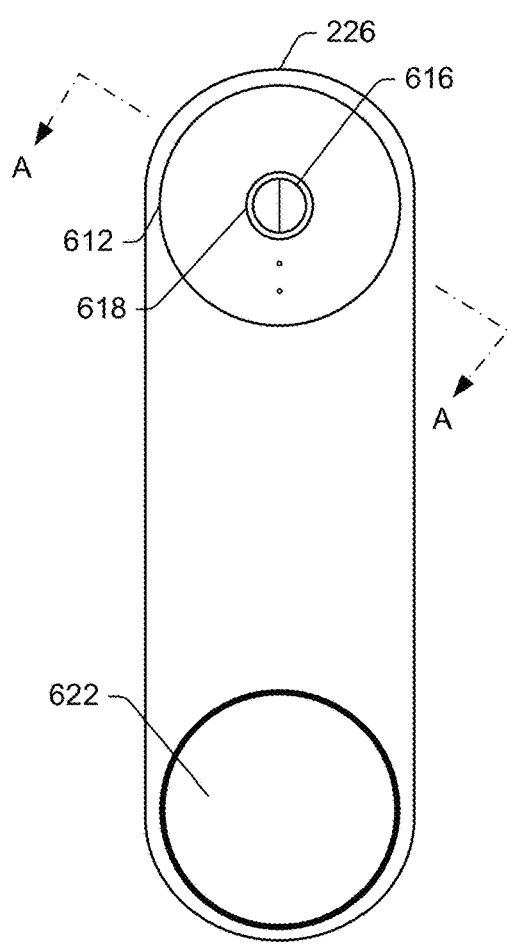
FIG. 7 illustrates a front elevational view of the example doorbell in FIG. 6.

FIG. 7 illustrates a front elevational view 700 of the example doorbell 226 in FIG. 6. As illustrated, the camera lens 616 of the camera module 442 (not shown in FIG. 7) is centered with respect to the IR cover 612 and encircled by the retainer 618. In the xy-plane (e.g., cross-section of the retainer 618), the button 622 has an elliptical shape, in which its major axis and minor axis are different (e.g., forming an ellipse) or equal to one another (e.g., forming a circular shape). The IR cover 612 may have an elliptical shape similar to that of the button 622.

Figure 8:
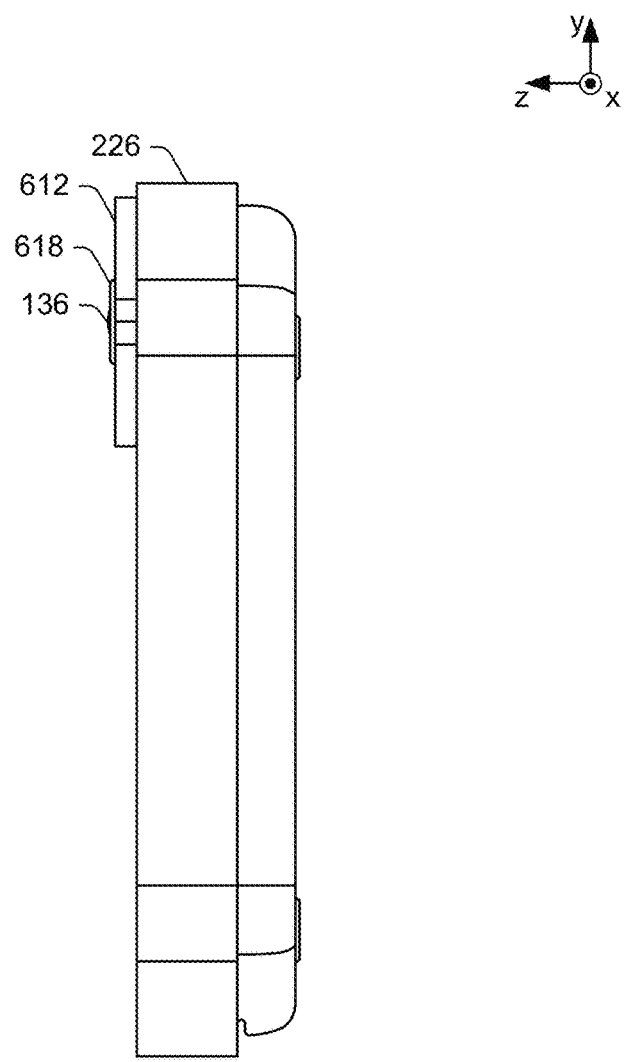
FIG. 8 illustrates a right elevational view of the example doorbell in FIG. 6, in accordance with some implementations.

FIG. 8 illustrates a right elevational view 800 of the example doorbell 226 in FIG. 6, in accordance with some implementations. As illustrated, the retainer 618 extends outwardly (in the z-direction) from the IR cover 612, which prevents IR light traveling through the IR cover 612 from leaking into the camera lens 616. The camera lens 616 may extend outwardly (in the z-direction) from the retainer 618 in order to maximize the field of view of the image sensor (e.g., image sensor 408 in FIG. 4) via the camera lens 616.

Figure 9:
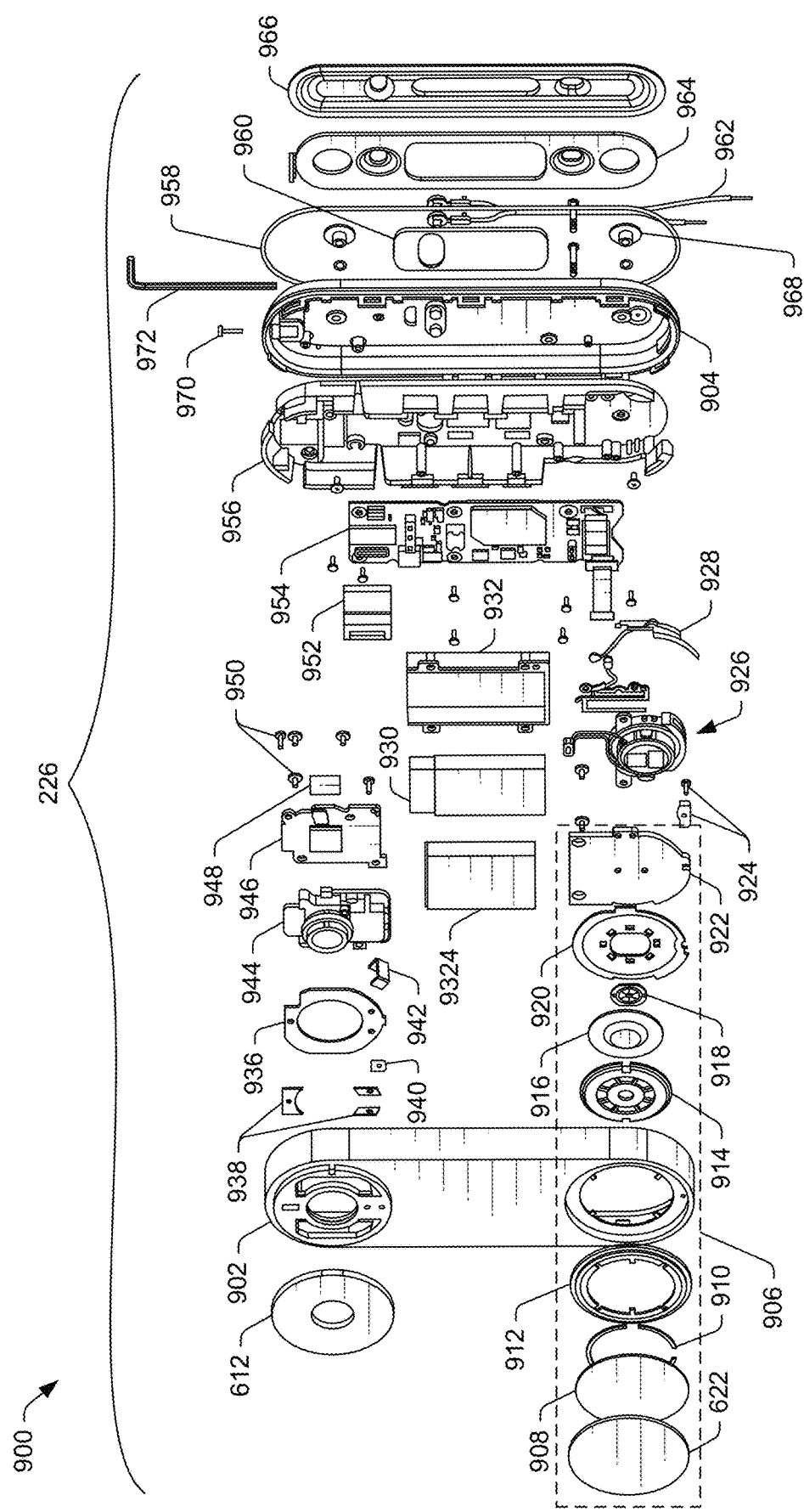
FIG. 9 illustrates an exploded view of the example doorbell in FIG. 6.

FIG. 9 illustrates an exploded view 900 of the example doorbell 226 in FIG. 6. The doorbell 226 includes a front housing component 902 and a rear housing component 904, which connect together to form a housing that encloses various components of the doorbell 226. The IR cover 612 is assembled to an exterior surface (e.g., front surface, the first surface 614 in FIG. 6) of the front housing component 902. At the button-side end 610, the doorbell 226 includes a button subassembly 906, which may include the button 622, a first reflector 908, button foam 910, a button flange 912, a light guide 914, a rubber button 916, a dome 918, a second reflector 920, and a button PCB (e.g., button board 922). One or more fasteners (e.g., fasteners 924) may be used to assemble the components of the button subassembly 906 together.

The doorbell 226 also includes a speaker subassembly 926 and one or more antennas 928, which are assembled in proximity to one another and to the button subassembly 906. The doorbell 226 includes a battery 930, which may be seated into a battery frame 932. A battery heater 934 may be used to heat the battery 930 to maintain the battery 930 within an operable temperature range when the doorbell 226 is exposed to a cold environment (e.g., sub-zero temperatures).

At the camera-side end 608, the doorbell 226 may include a PCB 936, which may be a subassembly for IR sensors (passive infrared sensors), IR LEDs, and/or audio sensors (e.g., microphone). Pressure-sensitive adhesive (PSA) 938 may be disposed between the PCB 936 and the front housing component 902. Also, mesh 940 for the audio sensor may be disposed adjacent to the audio sensor. Additionally, an IR flexible printed circuit (FPC) 942 may connect the PCB 936 to the camera module 442. The camera module 442 includes a camera subassembly 944 and a PCB (e.g., camera board 946). The camera subassembly 944 is aligned with the IR cover 612. In aspects, one or more thermal interface materials (TIMs) 948 may be disposed adjacent to the camera board 946 to transfer heat generated by one or more integrated circuit components on the camera board 946, including an image sensor. Fasteners 950 may be used to fasten the camera board 946 to the camera subassembly 944 and/or the front housing component.

A main FPC 952 may be used to connect the camera board 946 to a main logic board (MLB) subassembly 954 for the doorbell 226. A heat sink 956 may be disposed adjacent to the MLB subassembly 954 to distribute heat away from the MLB subassembly 954 and transfer the heat toward the housing, including the rear housing component 904. A gasket 958 (e.g., an O-ring) may be disposed between the rear housing component 904 and the front housing component 902 to form a seal and prevent water ingress along the seam between the housing components 902 and 904. The doorbell 226 may also include a label plate 960 for adding and/or interchanging one or more labels. Electrical connectors 962 (e.g., wiring, dongle) are used to connect the doorbell 226 to line power. To mount the doorbell 226 to a surface (e.g., a wall), a wall plate 964 and/or a wedge 966 may be used. The wall plate 964 and the wedge 966 may be fixed to the surface. The doorbell 226 includes one or more studs 968 that are attached to the rear housing component 904 and are configured to hook onto the wall plate 964 to secure the doorbell 226 to the surface. After assembling the doorbell 226 to the wall plate 964, a lock fastener 970 may be used to further secure the doorbell 226 to the wall plate 964. A hex key 972 (e.g., Allen key) or other suitable tool may be used to insert and tighten the lock fastener 970 into place.

Figure 10:
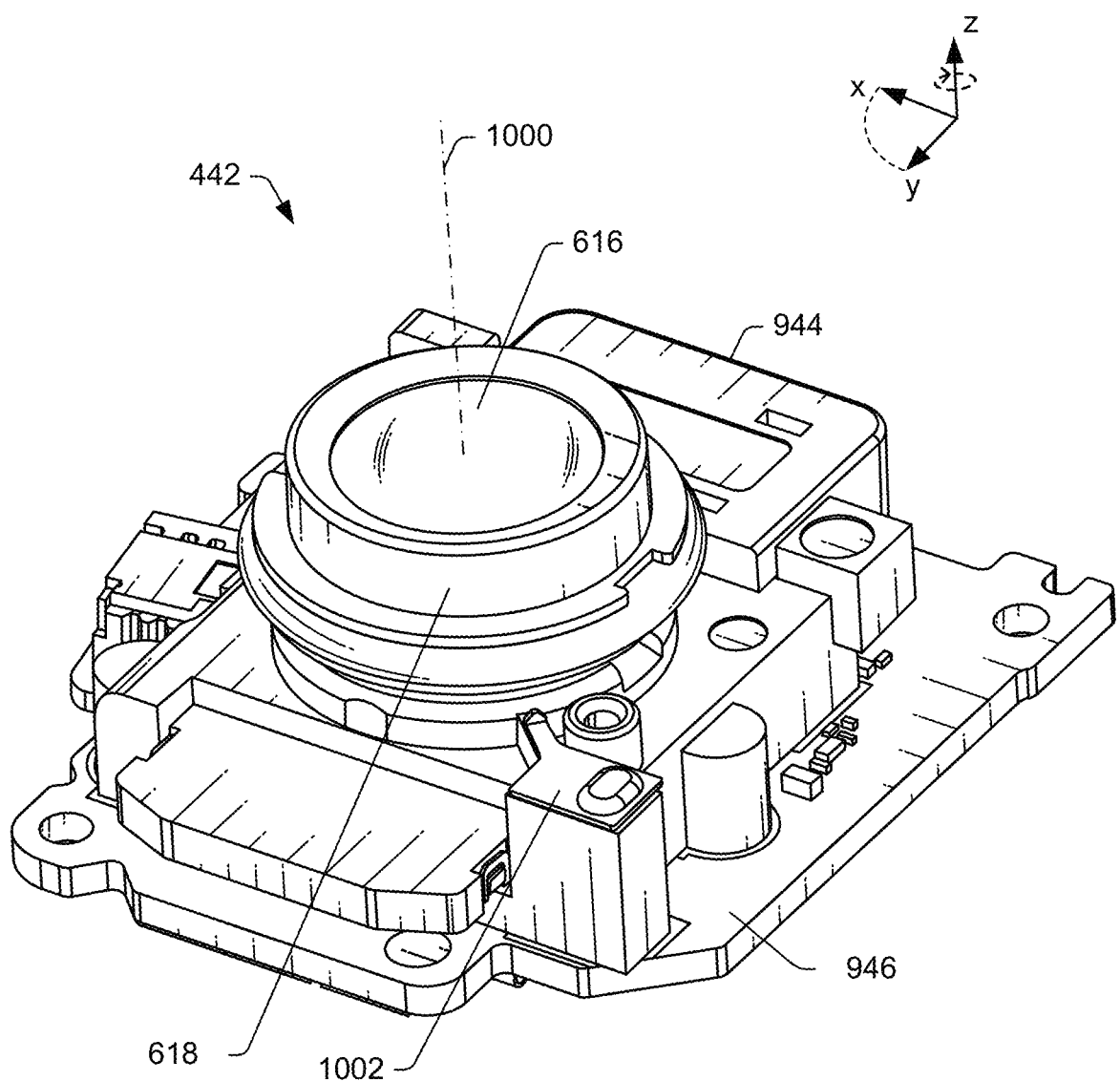
FIG. 10 illustrates an example implementation of a camera module.

FIG. 10 illustrates an example implementation of a camera module (e.g., the camera module 442). In the illustrated example, the camera subassembly 944 is mounted to the camera board 946. Also, the camera module 442 includes a movable lens retainer (e.g., retainer 618), which is movable along the z-axis (e.g., direction of an axial center 1000 of the camera lens) for camera focus tuning. The retainer 618 surrounds the camera lens 616 to prevent IR light from leaking into the camera lens 616 in the xy-plane. The retainer 618 is metal, however, and therefore vulnerable to attracting ESD sparks. Included in the camera subassembly 944 is an electrically conductive material (e.g., ESD bridge component 1002, also referred to herein as a "lightning rod structure"), which is configured to guide ESD energy passing through the retainer 618 to the system ground. In this way, the ESD bridge component 1002 acts as a bridge to route the ESD current from the retainer to the system ground. The ESD bridge component 1002 may have any suitable shape, including the illustrated planar shape with a body portion and an arm portion extending outwardly from the body portion in the plane. The ESD bridge component 1002 may be oriented relative to the retainer 618 such that the arm is between the body and the retainer 618. The tip of the arm is sharp (e.g., triangular, pointed). In this way, the electrical field between the ESD bridge component 1002 and the retainer 618 is significantly higher than other regions and the space (e.g., gap) between the tip of the arm and the retainer 618 is easier to be electrically broken down. In one implementation, the plane defined by the planar shape of the ESD bridge component 1002 is substantially orthogonal to the axial center 1000 of the camera lens 616. In another implementation, the plane defined by the planar shape of the ESD bridge component 1002 is non-orthogonal and non-parallel to the axial center 1000 of the camera lens 616. In other implementations, the ESD bridge component 1002 has a non-planar shape (e.g., curved) but guides the ESD current away from the retainer 616 and to the system ground.

Figure 11:
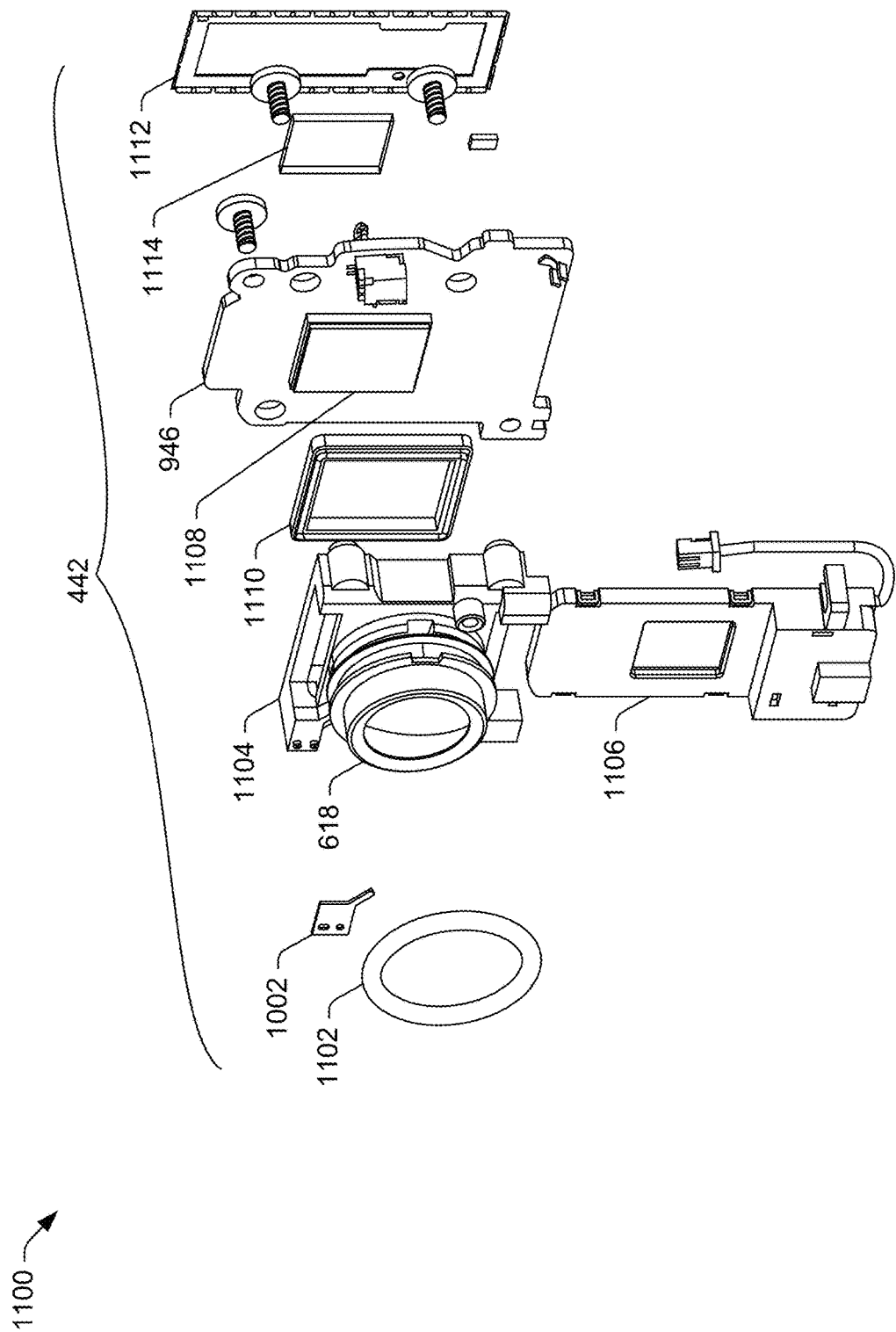
FIG. 11 illustrates an exploded view of the camera module in FIG. 10.

FIG. 11 illustrates an exploded view 1100 of the camera module 442 in FIG. 10. The camera module 442 includes a gasket 1102 (e.g., O-ring), the ESD bridge component 1002, and the retainer 618 assembled to a lens holder 1104. A removable IR cut filter 1106 (ICR 1106) may be inserted into the lens holder 1104. The camera board 946 includes an image sensor 1108 (e.g., the image sensor 408), which may be protected by a rubber seal 1110. When assembled together, the ICR 1106 is arranged between the camera lens 616 and the image sensor 1108 to block IR light during the day to enable capture of clear images. At night, the ICR 1106 may be moved away from the lens for surveillance in low light. The camera module 442 may also include a shielding element 1112 having graphite. One or more thermal interface materials 1114 may be disposed between the camera board 946 and the shielding element 1112 to help distribute heat generated by integrated components (e.g., the image sensor 1108) on the camera board 946. The camera module 442 and its components are further described with respect to FIG. 12.

Figure 12:
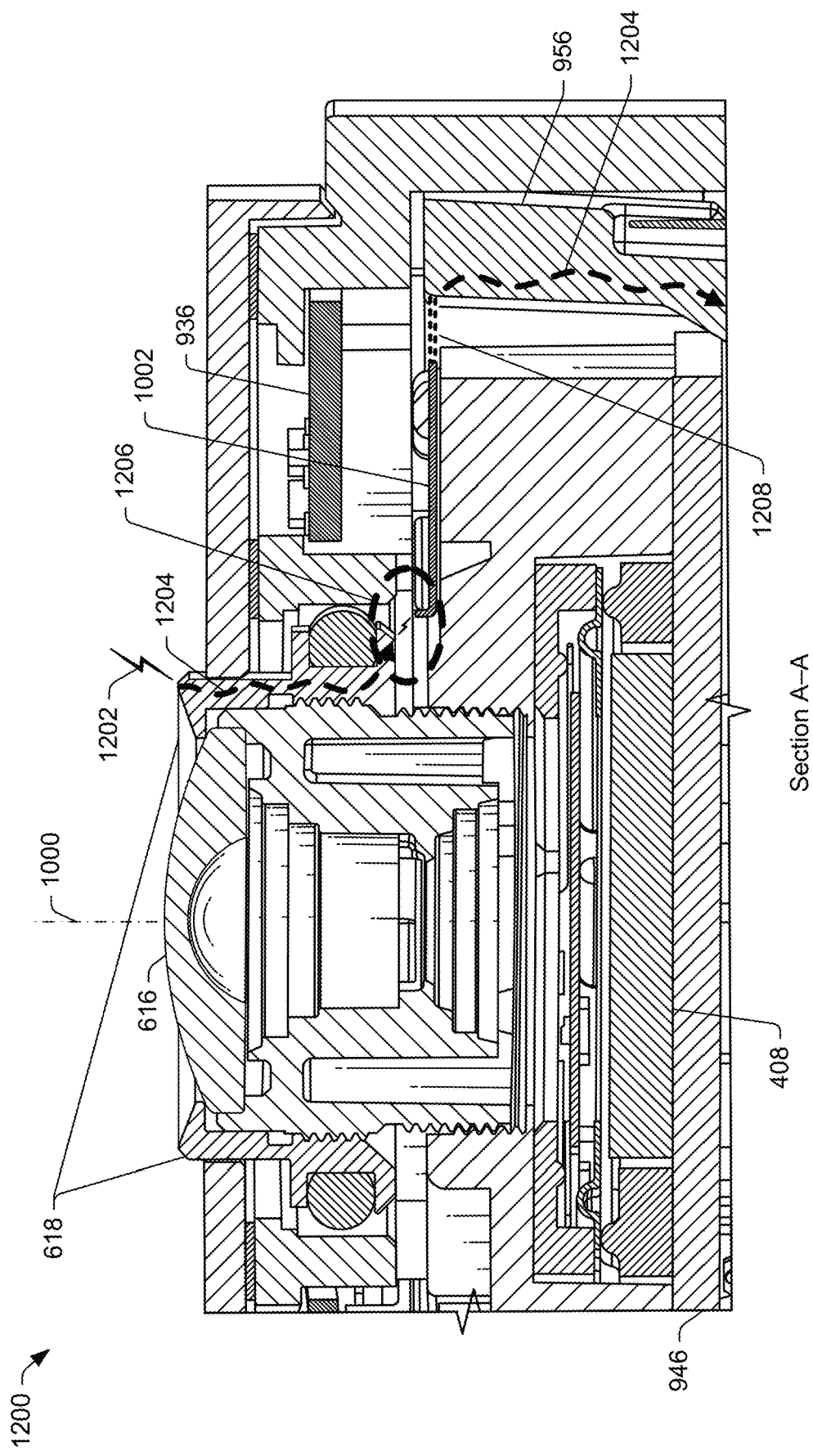
FIG. 12 illustrates a cross-section view of the doorbell device in FIG. 7, taken along line A-A in FIG. 7.

FIG. 12 illustrates a cross-section view 1200 of the doorbell 226 in FIG. 7, taken along line A-A in FIG. 7. When an ESD spark 1202 hits the metal retainer 618, ESD current 1204 travels through the retainer 618. For example, the retainer 618 may receive the ESD current 1204 when an ESD spark jumps from an electrostatically charged person or object that touches or moves into proximity (e.g., 5.0 mm, 3.5 mm, 2.0 mm, 1.0 mm, 0.5 mm) of the retainer 618. The ESD bridge component 1002 is disposed in a location and an orientation to provide a conductive path for the ESD current 1204 from the retainer 618 to system ground (e.g., the heat sink 956, which may be grounded to an external ground via one or more conductive paths in the doorbell 226). The ESD bridge component 1002 does not touch or contact the retainer 618, enabling the retainer 618 to move during focus tuning of the camera without adversely affecting a connection to the ESD bridge component 1002. Rather, a gap (e.g., gap 1206) exists between the retainer 618 and the ESD bridge component 1002 to enable movement of the retainer 618 relative to the ESD bridge component 1002. The gap 1206 may include any suitable insulation material, which is flexible or compressible, including air, gas (e.g., nitrogen), plastic, or other material that experiences electrical breakdown at voltage levels associated with electrostatic discharges to establish a conductive path for the ESD current. The gap 1206 is sufficiently small, however, to provide a path of least resistance from the retainer 618 to the ESD bridge component 1002. In an example, if the gap is an air gap, the electrical breakdown results in an electric arc of current flowing from the retainer 618 to the ESD bridge component 1002. Depending on space constraints within the doorbell 226, the ESD bridge component 1002 may include a lip, rib, wall, or extension disposed at the end of the arm of the ESD bridge component 1002 and extending in a direction that is non-parallel to the plane of the body of the ESD bridge component 1002 (e.g., ±30, ±45, ±60, ±90 degrees relative to a surface of the ESD bridge component 1002).

The ESD current 1204 jumps from the retainer 618 to the ESD bridge component 1002. The ESD current 1204 then flows through the ESD bridge component 1002 and passes to a grounding element, such as the heat sink 956. Optionally, another gap (e.g., gap 1208) exists between the ESD bridge component 1002 and the heat sink 956. The gap 1208 may include the same (or similar) material as that of the gap 1206 (e.g., air, gas, plastic). In some implementations, the gap 1208 may include a different material than that of the gap 1206, where the different material experiences electrical breakdown at voltage levels associated with electrostatic discharges to establish a conductive path for the ESD current. Because there is no movable or dynamic part in or adjacent to the gap 1208, galvanic contact (e.g., spring, pogo pin, conductive foam) can be used to establish the ESD path through the gap 1208 between the ESD bridge component 1002 and the heat sink 956. Using the gap 1208, the ESD current 1204 jumps from the ESD bridge component 1002 to the heat sink 956. The heat sink 956 may be connected to other grounding elements, which ground the ESD current 1204, (e.g., to an external ground) for the doorbell 226.

The gap 1206 and the gap 1208 may have any suitable width that enables the ESD current 1204 to jump from one component to the next component, in particular to jump from the retainer 618 to the ESD bridge component 1002 and then from the ESD bridge component 1002 to system ground (e.g., the heat sink 956). In some aspects, the gaps 1206 and 1208 may have the same width. In some aspects, the gaps 1206 and 1208 may have different widths. The widths of the gaps 1206 and 1208 may be within a range of, e.g., 0.5 millimeters (mm) to 5 mm.

The ESD bridge component 1002 acts as a bridge between the retainer 618 and the grounding element (e.g., the heat sink 956) for controlling the ESD current 1204 of the ESD spark 1202. By providing a conductive path away from ESD-sensitive circuitry, the ESD spark does not affect the operation of the camera. Rather, the ESD current 1204 flows in a controlled way, by being routed to a safe location and being prevented from jumping to undesirable locations in the doorbell 226, such as to an ESD-sensitive PCB (e.g., the PCB 936, the camera board 946). The ESD bridge component 1002 may be disposed at any suitable location between the retainer 618 and the system ground (e.g., the heat sink 956, which is safely grounded). In the illustrated example, the ESD bridge component 1002 is disposed on one side of the retainer 618 between the PCB 936 and the camera board 946.

By implementing the ESD bridge component 1002, there is no need for ESD protection circuitry (e.g., TVS diodes, metal oxide varistor (MOV)) in the surrounding parts (e.g., the camera board 946, the PCB 936) to handle the ESD current. Accordingly, component cost of the doorbell 226 associated manufacturing costs are reduced. Therefore, in some implementations, there are zero TVS diodes in the surrounding parts (the camera board 946, the PCB 936). The lack of TVS diodes in the assembly not only reduces manufacturing and component costs, but also enables the overall thickness (e.g., depth measured along the z-axis (see FIG. 6)) to be thinner than in many conventional devices (including doorbell devices) having a camera module.

CONCLUSION

Although aspects of a camera module with ESD protection have been described in language specific to features and/or methods, the subject of the appended claims is not necessarily limited to the specific features or methods described. Rather, the specific features and methods are disclosed as example implementations of the techniques for a camera module with ESD protection, and other equivalent features and methods are intended to be within the scope of the appended claims. Further, various different aspects are described, and it is to be appreciated that each described aspect can be implemented independently or in connection with one or more other described aspects.

What is claimed is:

1. A camera module for an electronic device, the camera module comprising:
   a camera lens;
   an image sensor aligned with the camera lens;
   a retainer encircling the camera lens, the retainer being movable during a focus tuning of the camera module; and
   an electrostatic discharge bridge component arranged to provide a controlled path for an electrostatic discharge current to travel from the retainer to a system ground of the electronic device, the electrostatic discharge bridge component separated from the retainer by a gap and positioned to guide the electrostatic discharge current away from the image sensor.

2. The camera module of claim 1, wherein the electrostatic discharge bridge component is configured to prevent the electrostatic discharge current from jumping to circuitry that is sensitive to the electrostatic discharge current.

3. The camera module of claim 2, wherein the circuitry includes at least one of:
   a camera board having the image sensor; or
   a printed circuit board having one or more infrared light sources.

4. The camera module of claim 1, wherein the gap separates the electrostatic discharge bridge component from the retainer by a width that is within a range of 0.5 millimeters to 5 millimeters.

5. The camera module of claim 1, wherein the retainer is movable in a direction of an axial center of the camera lens.

6. The camera module of claim 1, wherein the retainer is configured to receive the electrostatic discharge current from an electrostatic discharge spark jumping from an electrostatically charged person or object that touches or moves into proximity of the retainer.

7. The camera module of claim 1, further comprising a lens holder configured to be mounted to a camera board having the image sensor and support the camera lens, wherein the electrostatic discharge bridge component is disposed on the lens holder.

8. The camera module of claim 7, wherein the electrostatic discharge bridge component includes a planar shape and is oriented to have a plane defined by the planar shape be non-parallel to an axial center of the camera lens.

9. An electronic device comprising:
   a housing;
   circuitry that is sensitive to electrostatic discharge current;
   a system ground for grounding the electrostatic discharge current; and
   a camera module comprising:
      a camera lens;
      an image sensor aligned with the camera lens;
      a retainer encircling the camera lens, the retainer being movable during a focus tuning of the camera module; and
      an electrostatic discharge bridge component arranged to provide a controlled path for the electrostatic discharge current to travel from the retainer to the system ground, the electrostatic discharge bridge component separated from the retainer by a gap and positioned to guide the electrostatic discharge current away from the image sensor.

10. The electronic device of claim 9, wherein the retainer is configured to extend outwardly from the housing and be exposed to an environment surrounding the electronic device.

11. The electronic device of claim 9, wherein the retainer has a substantially tubular shape.

12. The electronic device of claim 9, wherein the system ground includes a heat sink.

13. The electronic device of claim 12, wherein:
   the gap is a first gap;
   the electrostatic discharge bridge component is separated from the heat sink by a second gap; and
   the second gap separates the electrostatic discharge bridge component from the heat sink by a width that is within a range of 0.5 millimeters to 5 millimeters.

14. The electronic device of claim 9, further comprising a printed circuit board disposed in proximity to the retainer, wherein the electrostatic discharge bridge component prevents the electrostatic discharge current from jumping to the printed circuit board.

15. The electronic device of claim 9, wherein the electronic device is a video-recording doorbell.

16. The electronic device of claim 9, wherein the retainer is movable in a direction of an axial center of the camera lens.

17. The electronic device of claim 9, wherein the retainer is configured to receive the electrostatic discharge current from an electrostatic discharge spark jumping from an electrostatically charged person or object that touches or moves into proximity of the retainer.

18. The electronic device of claim 9, wherein the circuitry includes a camera board having the image sensor.

19. The electronic device of claim 18, further comprising a lens holder configured to be mounted to the camera board and support the camera lens, wherein the electrostatic discharge bridge component is disposed on the lens holder.

20. The electronic device of claim 19, wherein the electrostatic discharge bridge component includes a planar shape and is oriented to have a plane defined by the planar shape be non-parallel to an axial center of the camera lens.

* * * * *